United States Patent
Nishi

(10) Patent No.: US 6,745,251 B2
(45) Date of Patent: Jun. 1, 2004

(54) COMMUNICATION APPARATUS MANAGING INSERTED PACKAGE MOUNTING STATES AND COMMUNICATION NETWORK MANAGEMENT SYSTEM INCLUDING THE SAME

(75) Inventor: Koji Nishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/332,998

(22) Filed: Jun. 15, 1999

(65) Prior Publication Data

US 2003/0172140 A1 Sep. 11, 2003

(30) Foreign Application Priority Data

Jun. 18, 1998 (JP) .......................................... 10/170990

(51) Int. Cl.⁷ .............................................. G06F 13/00
(52) U.S. Cl. ............................. 710/8; 710/19; 710/104; 710/300
(58) Field of Search ....................... 710/8–19, 300–304, 710/104, 305–313

(56) References Cited

U.S. PATENT DOCUMENTS

| | | | | |
|---|---|---|---|---|
| 5,517,646 A | * | 5/1996 | Piccirillo et al. | 713/1 |
| 5,530,895 A | * | 6/1996 | Enstrom | 710/9 |
| 5,748,980 A | * | 5/1998 | Lipe et al. | 710/8 |
| 5,768,542 A | | 6/1998 | Enstrom et al. | |
| 5,828,899 A | * | 10/1998 | Richard et al. | 335/828 |
| 5,978,862 A | * | 11/1999 | Kou et al. | 710/14 |
| 6,029,211 A | * | 2/2000 | Nakashima | 710/14 |
| 6,292,848 B1 | * | 9/2001 | Plyler et al. | 710/8 |
| 6,353,885 B1 | * | 3/2002 | Herzi et al. | 713/1 |
| 6,363,452 B1 | * | 3/2002 | Lach | 710/316 |

FOREIGN PATENT DOCUMENTS

| | | |
|---|---|---|
| EP | 0 854 607 A1 | 7/1998 |
| JP | 58-184899 | 10/1983 |
| JP | 5-120247 A | 5/1993 |
| JP | 6-90288 | 3/1994 |
| JP | 7-321799 A | 12/1995 |
| JP | 8-305654 A | 11/1996 |
| JP | 9-74417 | 3/1997 |
| JP | 9-237241 A | 9/1997 |

OTHER PUBLICATIONS

1. Special Edition: "PC Card Development Primer", Interface, vol. 21, No. 6, Issue 217, Jun. 1995, Japan, CQ Publishers, pp. 60–74.

* cited by examiner

Primary Examiner—Christopher B. Shin
(74) Attorney, Agent, or Firm—Sughrue Mion, PLLC

(57) ABSTRACT

A communication apparatus enables an establishment data of a package type concerned to be established to a package to settle a communication pass although the establishment data of the package mounted is not established from an external system. The communication apparatus has a plurality of slots into which the package is inserted. The communication apparatus settles a communication pass in such a way that a configuration data is established for the package installed on the inside of the slot. The slot is capable of installing voluntary package therein. There is provided a data processor which establishes the configuration data to the package mounted.

12 Claims, 17 Drawing Sheets

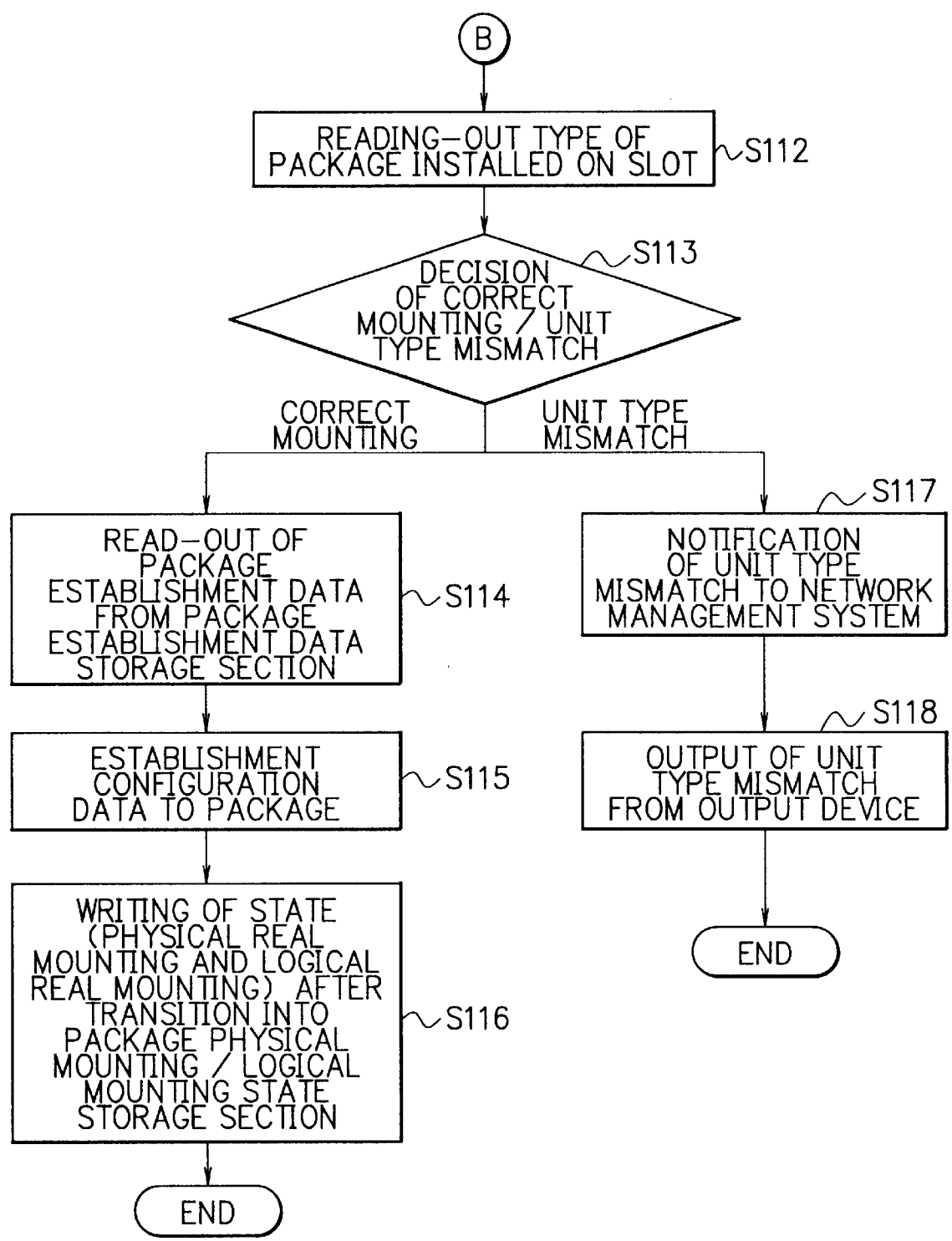

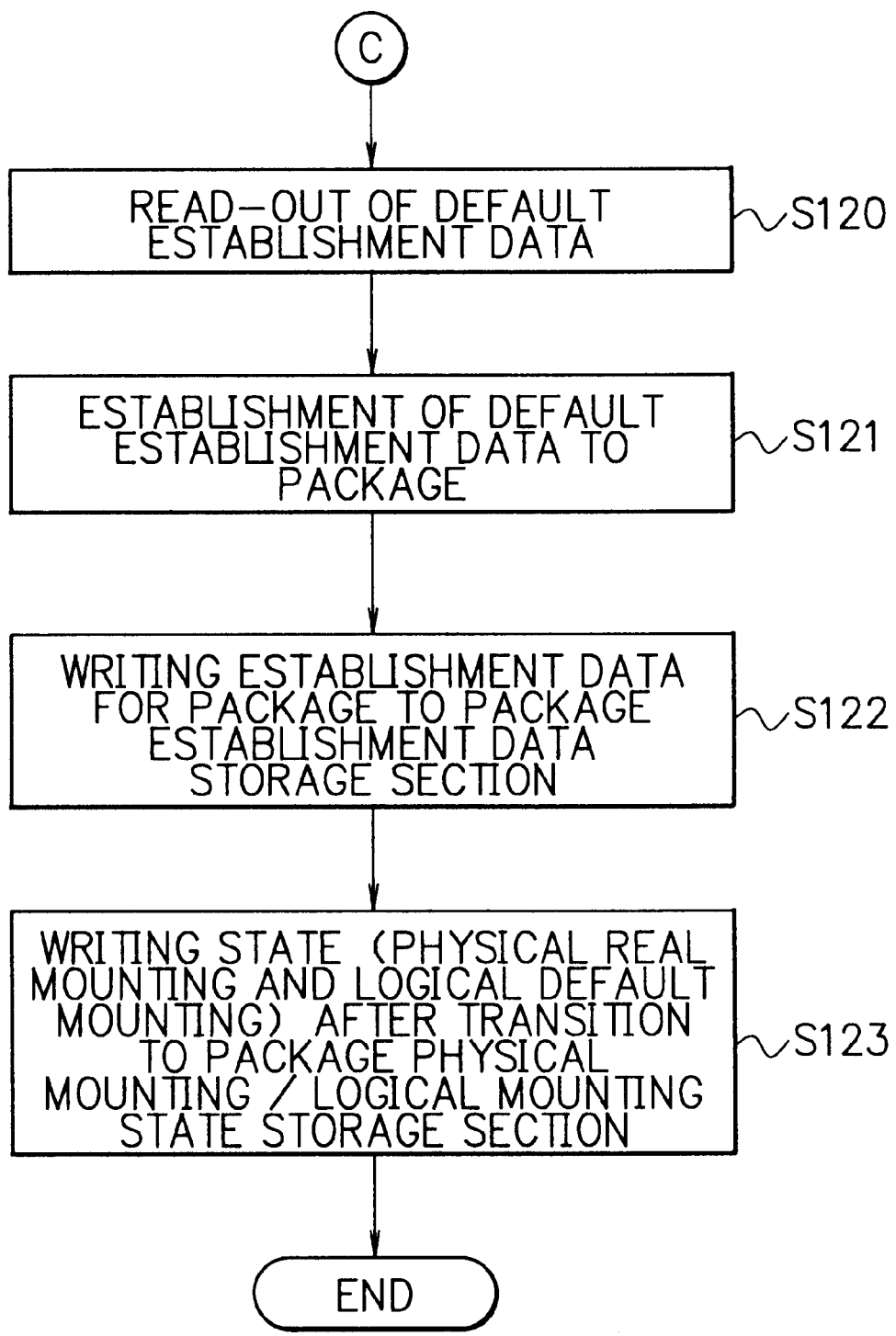

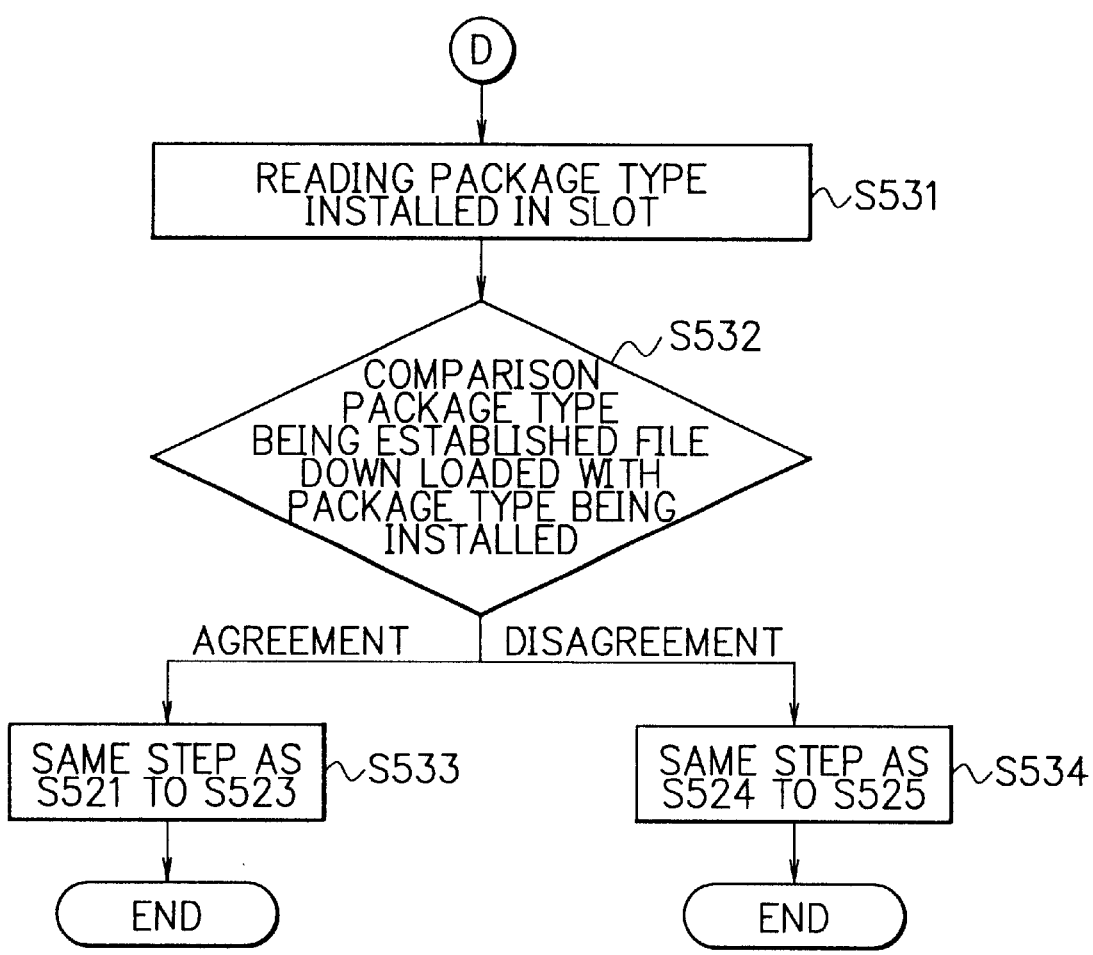

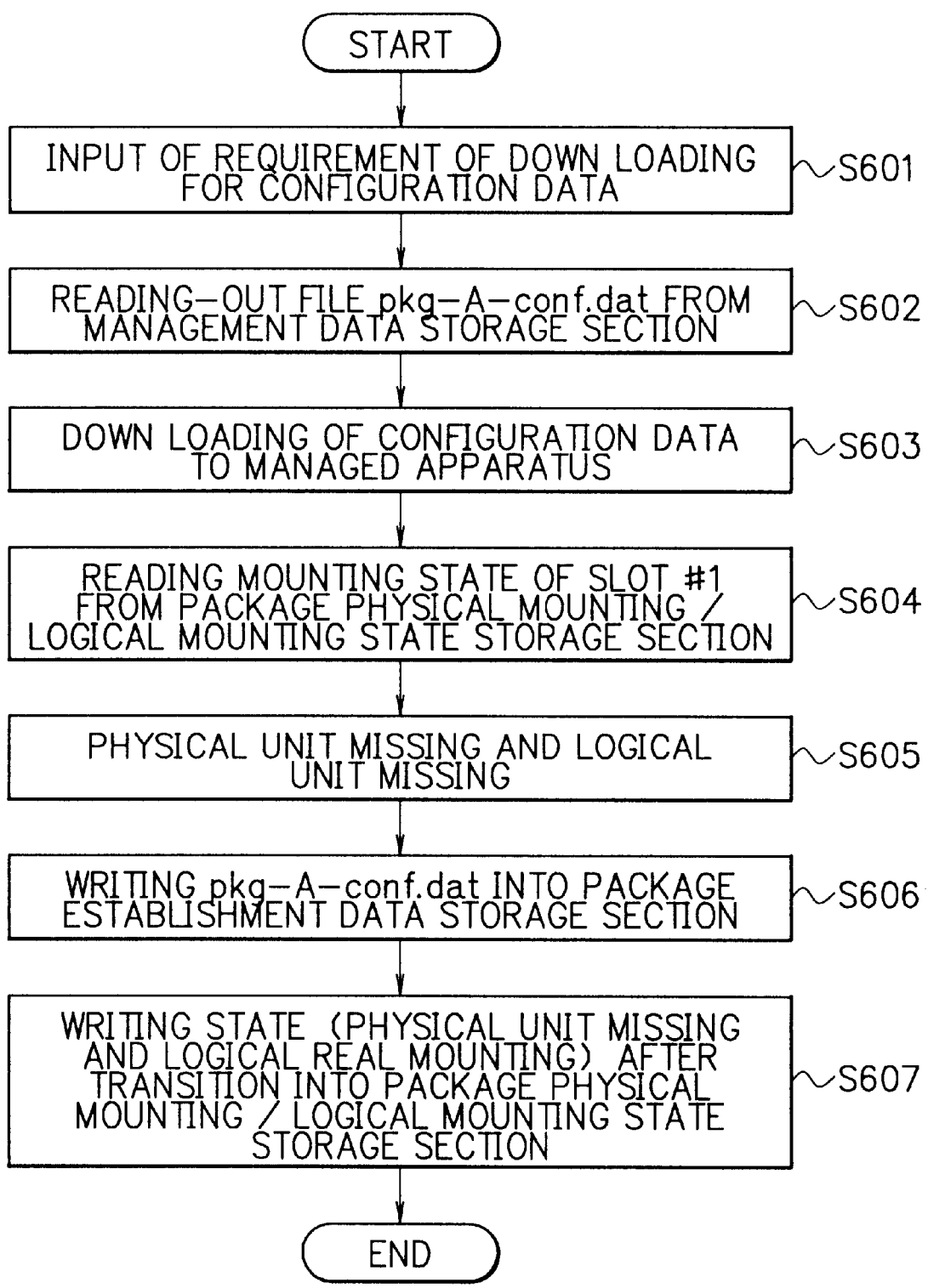

COMMUNICATION APPARATUS MANAGING INSERTED PACKAGE MOUNTING STATES AND COMMUNICATION NETWORK MANAGEMENT SYSTEM INCLUDING THE SAME

BACKGROUND OF THE INVENTION

The present invention relates to a communication apparatus and a communication network management system. More particularly, this invention relates to a communication apparatus and a communication network management system in order to establish a provisioning data thereto, which data is data peculiar to the device.

DESCRIPTION OF THE PRIOR ART

A configuration data of the communication apparatus includes the configuration data for a package, a port, an interface and so forth. Generally, the configuration data is established collectively, as the peculiar provisioning data of the device, in every package unit.

With respect to management of the provisioning data, for instance, the Japanese Patent Application Laid-Open No. HEI 9-74417 discloses Provisioning Data Management Method, and the Japanese Patent Application Laid-Open No. HEI 6-90288 discloses Provisioning Method of Data Processing Apparatus.

The provisioning data management method develops the provisioning data over the provisioning storage area beforehand. The provisioning data is the data for the unit used as the unit of redundant structure. In the provisioning data management method of the digital data transmitter/receiver, when the mounting mode of the unit for redundant structure is determined beforehand, whether the unit is installed on the inside of the slot practically or not, the provisioning data is developed over the provisioning data storing area beforehand.

However, there is the following problems in the provisioning data management method.

The first problem is that there can not be managed the provisioning data of the unit with the exception of the unit used for the redundant structure. Because in the provisioning data management method, there is no description regarding the provisioning of the regular unit.

The second problem is that the position of the slot is fixed, into which certain type unit is capable of being installed. Therefore it is incapable of being inserted the unit into voluntary slot which is possible to be inserted physically. Because, when the mounting mode of the unit is determined, the unit is restrained into the unit capable of being inserted into the slot, in order to cause the provisioning data of the unit to be stored in the provisioning data storage area for the sake of the unit concerned.

The third problem is that the external system such as the network management system and so forth becomes indispensable for carrying out the provisioning of the unit. Because, it is necessary to store the provisioning data of the unit in the provisioning data storage area from the external system.

In the provisioning method of the data processing apparatus as the later method, a comprehensive global code is established instead of an individual code as the provisioning information to the interface unit whose system configuration is uncertain. For that reason, incorrect alarm does not occur irrespective of kind of the interface unit which is equipped practically at the time of start of the system.

However, there is the following problems in the provisioning method of the data processing apparatus as the later method.

The first problem is that the later method does not become the state capable of providing the communication service, since peculiar provisioning data of the type of the interface unit which is inserted physically is not established, it is incomplete as the establishment of the interface unit. Because the later method is the method for only preventing occurrence of incorrect alarm of the interface unit by establishing comprehensive global code instead of the individual code.

In the digital exchange system provided with a channel section, for instance, the Japanese Patent Application Laid-Open No. SHO 58-184899 discloses Unit Missing Detection Method as the method for detecting whether the line package is installed.

The unit missing detection method causes the circuit correspondence section to verify the mounting information of the line package transferred from the central control unit and the detection result of the line package under mounting practically to communicate the collation result to the central control unit. For that reason, un-installation of the circuit accommodation package and unit type mismatch of the circuit accommodation package in the circuit correspondence section are detected automatically, immediately, it is capable of being called maintenance operator's attention thereto.

However, in the unit missing detection method, only the un-installation and/or the unit type mismatch are detected automatically, so that the maintenance operator should cope with the state after detection.

Namely, there are following problems in the above-mentioned conventional provisional data management method and so forth.

The first problem is that in the establishment of conventional configuration data, it is necessary that the type of the package inserted into the slot of the communication apparatus is fixed. If the type of the package is not fixed, it is necessary to establish the configuration data including the type of the package inserted into the slot in every communication apparatus from the external system.

The second problem is that after inserting the package into the slot, it is necessary to establish peculiar configuration data of the package type from the external system to the communication apparatus.

The third problem is that when the fixed configuration data is established autonomously on the inside of the apparatus, the external system causes the establishment data for the package concerned to be changed. The package is extracted from the slot, before inserting the package into the slot again. The fixed configuration data is established again, thereby the establishment data from the external system becomes ineffective.

SUMMARY OF THE INVENTION

In view of the foregoing, it is an object of the invention to overcome the above-mentioned problem, by providing a communication apparatus, a network management system, a physical mounting/logical mounting management method of a package, a processing method for package establishment data, a storage medium for storing therein program for data processing within the apparatus, and a storage medium for storing therein a program for data processing in a network management system, in which the establishment data of the package type concerned is established to the package to be established the communication path, even if the establishment data of the package mounted is not established from the external system.

According to a first aspect of the present invention, in order to achieve the above-mentioned object, there is provided a communication apparatus which consists of a plurality of slots into which a package is inserted, thus a communication path is settled in such a way that a configuration data is established to the package installed in the slot, which communication apparatus comprises a data processor for establishing the configuration data to the package capable of being installed in the slot voluntarily.

According to a second aspect of the present invention, in the first aspect, there is provided a communication apparatus, wherein the data processor manages both of a physical mounting representing a mounting state whether the package is installed on the inside of the slot physically and a logical mounting representing a mounting state whether the configuration data to be established to the package installed on the inside of the slot is stored in a data storage section.

According to a third aspect of the present invention, in the first aspect, there is provided a communication apparatus, wherein the data processor establishes, when a package with un-established configuration data is installed on the inside of a slot with a state of physical unit missing and logical unit missing, the configuration data of default to the package.

According to a fourth aspect of the present invention, in the first aspect, there is provided a communication apparatus, wherein the data processor reestablishes, when the package of different type is reinstalled on the inside of the slot with the condition that the package to which the configuration data of the default is established is removed, the configuration data of the default of a type concerned.

According to a fifth aspect of the present invention, in the first aspect, there is provided a communication apparatus, wherein the data processor, when removing the package to which the configuration data is established from an external system, stores the configuration data established in an internal storage means, in the case where the package of the same type is inserted again, the configuration data stored therein is reestablished.

According to a sixth aspect of the present invention, in the first aspect, there is provided a communication apparatus, wherein the data processor implements downloading of the configuration data, including an establishment parameter of a communication path, before the package is inserted at the slot, thus the configuration data is established after insertion of the package.

According to a seventh aspect of the present invention, in the first aspect, there is provided a communication apparatus, wherein the data processor comprises a management data transmission/reception processor for implementing prescribed processing while transmitting/receiving a management data to an external system, a package establishment data processor for implementing a package establishment processing according to an input of either a package establishment default value data stored beforehand, or a package establishment data from the management data transmission/reception processor, a package physical mounting/logical mounting processor reading-out a mounting state of mounted package in order to require processing corresponding to the mounting state to the package establishment data processor, a package establishment means receiving the establishment data from the package establishment data processor, subsequently executing a establishment processing for the package mounted, thus communicating execution result to the package establishment data processor, a correct mounting/unit type mismatch decision means for deciding whether the mounted package is of the correct mounting or the unit type mismatch, before communicating the decision result to the package establishment data processor, and a package physical mounting decision means inspecting state of physical mounting of the package to require processing to the package physical mounting/logical mounting processor in answer to variation of the mounting state.

According to an eighth aspect of the present invention, there is provided a communication network management system which comprises a data processor for implementing data processing while receiving a management data established to a package installed from a communication apparatus that consists of a plurality of slots into which a package is inserted., Thus a communication path is settled in such a way that configuration data is established to the package installed in the slot. And also comprising a data output means for image displaying the management data.

According to a ninth aspect of the present invention, in the eighth aspect, there is provided a communication network management system, wherein the data processor comprises a management data processor receiving the management data, before transmitting a management message standardized to the communication apparatus, thus implementing a process in accordance with reception data, and a user interface processor for providing an output from the management data processor as a graphical user interface for the data output means.

According to a tenth aspect of the present invention, there is provided a management method of physical mounting/logical mounting of a package which comprises the steps of deciding a package establishment data with both of a mounting state data of the package concerned and a data received from hardware of the package inserted as a parameter, after receiving an insertion notification of the package, and implementing a package establishment data processing when state of before transition is of the physical real mounting and logical default mounting while deciding state transiting next according to mounting state of the package at the time of reception of omission notification of the package.

According to an eleventh aspect of the present invention, there is provided a processing method of package establishment data which comprises the steps of establishing a default establishment data to a package, before writing physical real mounting and logical default mounting as a state of after transition in case where the package concerned is of the physical unit missing and logical unit missing, implementing decision processing of correct mounting/unit type mismatch, in the case of correct mounting, establishing configuration data to the package to write physical real mounting and logical real mounting as the state of after transition, while in the case of unit type mismatch, performing indication of the unit type mismatch in case where the package concerned is of the physical unit missing and logical real mounting, establishing the configuration data to the package to write the physical real mounting and logical default mounting as the state of after transition in case where the package concerned is of the physical real mounting and logical unit missing, implementing the same processing as that of the case of the physical real mounting and logical unit missing in case where the package concerned is of the physical real mounting and logical default mounting, implementing the same processing as that of the case of the physical unit missing and logical real mounting in case where the package concerned is of the physical real mounting and logical real mounting.

According to a twelfth aspect of the present invention, there is provided a storage medium storing therein a program for the sake of data processing within an apparatus which comprises the steps of a step for deciding about the whole slots whether a package is inserted physically into a slot, after starting a managed apparatus, a step for requiring a package physical mounting/logical mounting processing with data of package type and so forth as a parameter in case of physical real mounting with the result of decision, a step for reading-out mounting state due to storage information at the time point, and a step for deciding the state of physical real mounting and logical real mounting about the package concerned, after reading-out the mounting state due to the storage information.

According to thirteenth aspect of the present invention, in the twelfth aspect, there is provided a storage medium storing therein a program for the sake of data processing within an apparatus, further comprising the steps of a step for deciding a package establishment data with both of data of mounting state of the package concerned and data received from hardware of the package inserted as a parameter after receiving insertion notification of the package, and a step for implementing package establishment data processing, when receiving an omission notification of the package, deciding the state of the next transition according to the mounting state of the package concerned.

According to a fourteenth aspect of the present invention, in the twelfth aspect, there is provided a storage medium for storing therein a program for the sake of data processing within an apparatus, wherein a step for deciding a state of physical real mounting and logical real mounting about the package concerned comprises the steps of a step for writing physical real mounting and logical default mounting as the state after transition while establishing a default establishment data to the package in case where the package concerned is of the physical unit missing and logical unit missing, a step in which when the package concerned is of the physical unit missing and logical real mounting, implementing decision processing of correct mounting/unit type mismatch, in the case of correct mounting, establishing configuration data to the package to write physical real mounting and logical real mounting as the state of after transition, while in the case of unit type mismatch, indicating as being unit type mismatch, a step for writing the physical real mounting and logical default mounting as the state after transition while establishing the configuration data to the package when the package concerned is of the physical real mounting and logical unit missing, a step for implementing the same processing as the case of the physical real mounting and logical unit missing when the package concerned is of the physical real mounting and logical default mounting, and a step for implementing the same processing as the case of the physical unit missing and logical real mounting when the package concerned is of the physical real mounting and the logical mounting.

According to a fifteenth aspect of the present invention, in the thirteenth aspect, there is provided a storage medium for storing therein a program for the sake of data processing within an apparatus, wherein a step for deciding a state of physical real mounting and logical real mounting about the package concerned comprises the steps of a step for writing physical real mounting and logical default mounting as the state after transition while establishing a default establishment data to the package in case where the package concerned is of the physical unit missing and logical unit missing, a step in which when the package concerned is of the physical unit missing and logical real mounting, implementing decision processing of correct mounting/unit type mismatch, in the case of correct mounting, establishing configuration data to the package to write physical real mounting and logical real mounting as the state of after transition, while in the case of unit type mismatch, indicating as being unit type mismatch, a step for writing the physical real mounting and logical default mounting as the state after transition while establishing the configuration data to the package when the package concerned is of the physical real mounting and logical unit missing, a step for implementing the same processing as the case of the physical real mounting and logical unit missing when the package concerned is of the physical real mounting and logical default mounting, and a step for implementing the same processing as the case of the physical unit missing and logical real mounting when the package concerned is of the physical real mounting and the logical mounting.

According to a sixteenth aspect of the present invention, there is provided a storage medium for storing therein a program for data processing within a communication network management system, which program is configured to generate steps comprising receiving a management data established to a package installed from a communication apparatus that consists of a plurality of slots into which a package is inserted, thus a communication path is settled in such a way that configuration data is established to the package installed in the slot, and a step of data output for image displaying the management data.

According to a seventeenth aspect of the present invention, in the sixteenth aspect, there is provided a storage medium storing therein a program for the sake of data processing within a communication network management system, wherein the step of data processing comprises the steps of a management data processing step in which the management data is received, before a standardized management message is transmitted to the communication apparatus, thus implementing processing due to reception data, and a user interface processing step for providing an output from the management data processing step as a graphical user interface.

As mentioned above, the communication apparatus according to the invention provided with the above constitution causes the data processor to establish the configuration data to the package installed in the slot which is capable of accommodating the package. For that reason, even though the establishment data of the package installed in the slot of the communication apparatus is not established from the external system, when the new package is inserted into the slot with the state of the physical unit missing and logical unit missing, the establishment data of the package type concerned is established to the package. Thus, it is possible to provide the communication service while the communication path is settled.

The above and further objects and novel features of the invention will be more fully understood from the following detailed description when the same is read in connection wit the accompanying drawings. It should be expressly understood, however, that the drawings are for purpose of illustration only and are not intended as a definition of the limits of the invention.

BRIEF DESCRIPTION OF THE DRAWINGS

FIG. 5 is a third flowchart showing flow of operation of the first example of the communication apparatus of FIG. 1;

FIG. 6 is a fourth flowchart showing flow of operation of the first example of the communication apparatus of FIG. 1;

FIG. 16 is a fifth flowchart showing flow of operation in the third example of the communication apparatus of FIG. 1; and FIG. 17 is a flowchart showing a concrete flow of operation in the third example.

DETAILED DESCRIPTION OF THE PREFERRED EMBODIMENT

A preferred embodiment of the invention will now be described in detail in accordance with the accompanying drawings.

Figure 1:
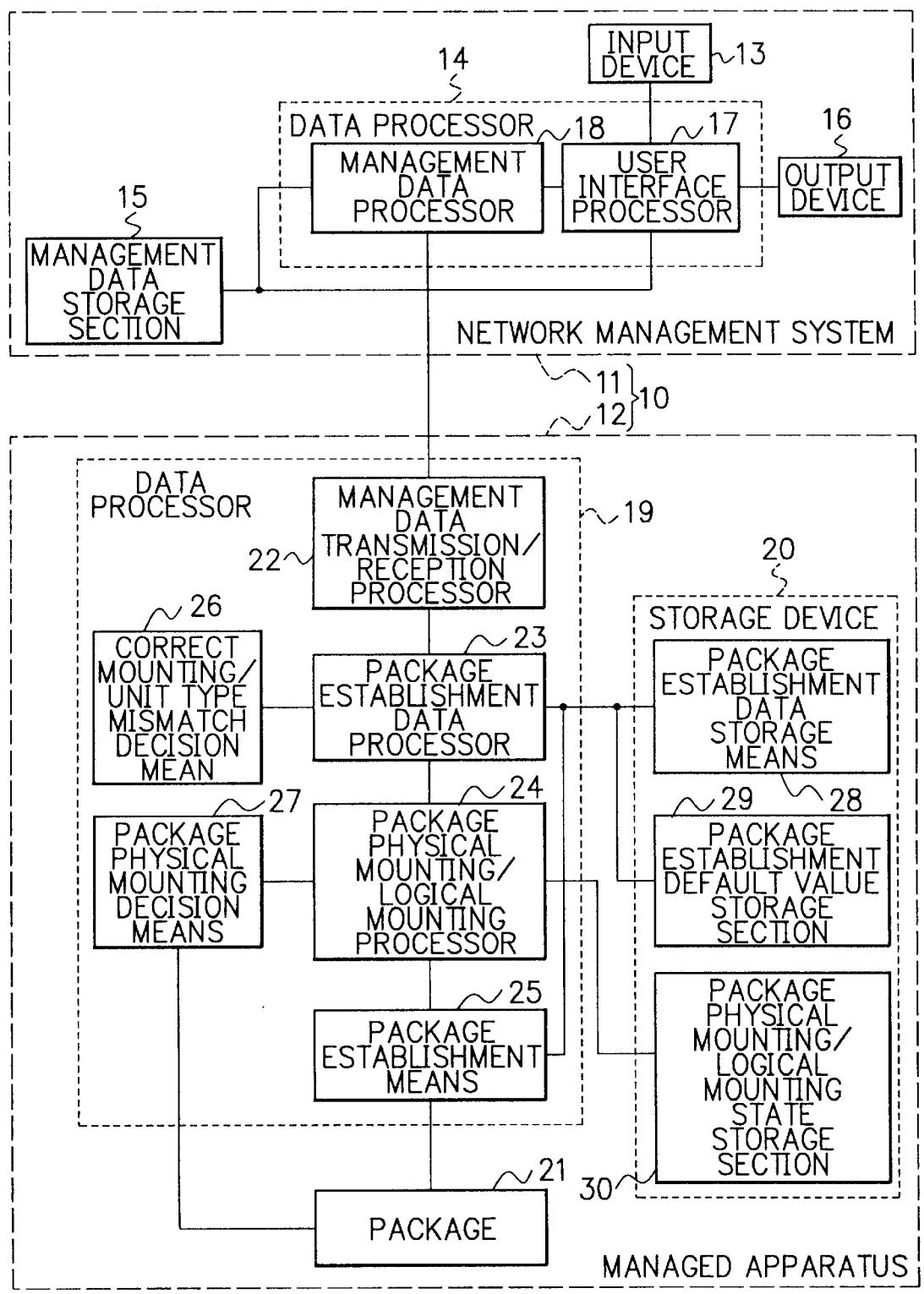
FIG. 1 is a block diagram showing a constitution of a communication apparatus according to an embodiment of the present invention.

FIG. 1 is a block diagram showing a constitution of a communication apparatus according to an embodiment of the present invention. As shown in FIG. 1, a communication system 10 consists of two subsystems which comprise a network management system 11, and a managed apparatus (communication apparatus) 12 which is managed by the network management system.

The network management system 11 includes an input device 13 such as a keyboard and so forth, a data processor 14 operating due to program control, and output device such as a display and so forth. The data processor 14 includes a user interface processor 17, and a management data processor 18.

The managed apparatus 12 includes a data processor 19 operating due to a program control, a storage device 20 for storing therein the management data, and a package 21 as being a management candidate. The package 21 consists of a hardware and a software in order to operation-control the hardware.

The data processor 19 consists of a management data transmission/reception processor 22, a package establishment data processor 23, a package physical mounting/logical mounting processor 24, a package establishment means 25, a correct mounting/unit type mismatch decision means 26, and a package physical mounting decision means 27. The storage device 20 consists of a package establishment data storage section 28, a package establishment default value data storage section 29, and a package physical mounting/logical mounting state storage section 30.

The user interface processor 17 of the data processor 14 provides a graphical user interface for an operator of the network management system 11. The data inputted from the input device 13 for communication path establishment and so forth is transferred to the management data processor 18. According to demand, the data form which is easy to recognize by the operator is converted into the data form which is easy to program-control in the data processor 19.

Furthermore, the data communicated through the management data processor 18 from the management data transmission/reception processor 22 is converted into the data form which is easy to recognize by the operator to be indicated to the output device 16. As the example of the communication data, trouble occurrence data and so forth of the managed device 12 are included.

The management processor 18 transmits GET, SET, CREATE, and DELETE which are standardized management messages to the management data transmission/reception processor 22 of the managed apparatus 12 while receiving a request from the user interface processor 17. The management data processor 18 receives GET•RESPONSE, SET•RESPONSE, CREATE•RESPONSE, and DELETE•RESPONSE from the management data transmission/reception processor 22 as the response for the transmission processing.

Further, when the trouble occurs on the managed apparatus 12, the management data processor 18 requires the storage of the event to the management data storage section 15 while receiving the event from the management data transmission/reception processor 22 to transfer to the user interface processor 17.

Furthermore, the management data processor 18 executes data calculation that the data of decimal system is converted into hexadecimal notation, and the management data processor 18 causes the reception data to be stored in the management data storage section 15, in connection with the reception data which is received from the management data transmission/reception processor 22 of the managed apparatus 12 and the user interface processor 17, and the management data processor 18 transmits the data received from the management data transmission/reception processor 22 toward the user interface processor 17.

The management data transmission/reception processor 22 of the data processor 19 provides access interface for the managed apparatus 12 to the network management system 11. The management data transmission/reception processor 22 requires the processing for the package establishment data processor 23 while receiving the management message of GET, SET, CREATE, DELETE, and so forth.

With this requirement, the management data transmission/reception processor 22 converts the response data of processing communicated from the reception side of requirement into the management message such as GET•RESPONSE, SET•RESPONSE, CREATE•RESPONSE, DELETE•RESPONSE, before transmitting to the management processor 18 in the network management system 11.

Furthermore, when a fault occurs in the managed apparatus 12, the management data transmission/reception processor 22 receives the fault data from the package establishment data processor 23, before communicating to the network management system 11.

The package establishment data processor 23 reads-out an establishment data from a package establishment default value data storage section 29, to require the processing for the package establishment means 25. When the package establishment data processor 23 succeeds in establishment of the default data in the package establishment means 25, causing the establishment data to be stored in the package establishment data storage section 28.

Furthermore, the package establishment data processor 23 receives the package establishment data which is required from the management data transmission/reception processor 22 to require a processing for the package establishment means 25. When the package establishment data processor 23 succeeds in data establishment in the package establishment means 25, storing the establishment data in the package establishment data storage section 28.

The package physical mounting/logical mounting processor 24 reads-out mounting state of the package 21 concerned from the package physical mounting/logical mounting state storage section 30 after the package physical mounting decision means 27 receives insertion notification of the package 21. The package physical mounting/logical mounting processor 24 requires the processing to the package establishment data processor 23 with both of the data received from the hardware of the package inserted and the data on mounting state as parameters. The package establishment data processor 23 determines processing content according to value of the parameter.

Furthermore, the package physical mounting/logical mounting processor 24 receives an omission notification of the package 21 from the package physical mounting decision means 27, thus reading-out mounting state of the package 21 concerned from the package physical mounting/logical mounting state storage section 30. According to the state read-out, the package physical mounting/logical mounting processor 24 determines next transitional state to write mounting state of the package 21 concerned in the package physical mounting/logical mounting state storage section 30. When the state before transition is a physical real mounting and logical default mounting, requiring the processing for the package establishment data processor 23.

The package establishment means 25 receives the establishment data from the package establishment data processor 23. The package establishment means 25 executes establishment processing for the package 21, before communicating to the package establishment data processor 23 with either a success or a failure as a response.

The package physical mounting decision means 27 checks periodically whenever it is necessary whether the package 21 is physically installed on the inside of the slot of the managed apparatus 12. When the state is changed either from insertion to omission, or from omission to insertion, the package physical mounting decision means 27 requires the processing for the package physical mounting/logical mounting processor 24 with the data of the package type and so forth as the parameter.

The package correct mounting/unit type mismatch decision means 26 decides whether the package 21 concerned is either correct mounting or unit type mismatch in accordance with processing requirement from the package establishment data processor 23 to return response.

The package establishment data storage section 28 stores therein the data established in the package 21. The establishment data is classified into the default establishment data and the data established while being required from the network management system 11.

The package establishment default value storage section 29 into which the data established to the package 21 is stored when the package 21 is inserted into the slot under the state of physical unit missing and logical unit missing. The default data which is stored therein is established in every type of the package 21.

The package physical mounting/logical mounting storage section 30 stores therein the mounting state of the package 21 concerned. As the mounting state, there are ① physical unit missing and logical unit missing,
② physical real mounting and logical unit missing,
③ physical real mounting and logical default mounting,
④ physical unit missing and logical real mounting, and
⑤ physical real mounting and logical real mounting.

Figure 2:
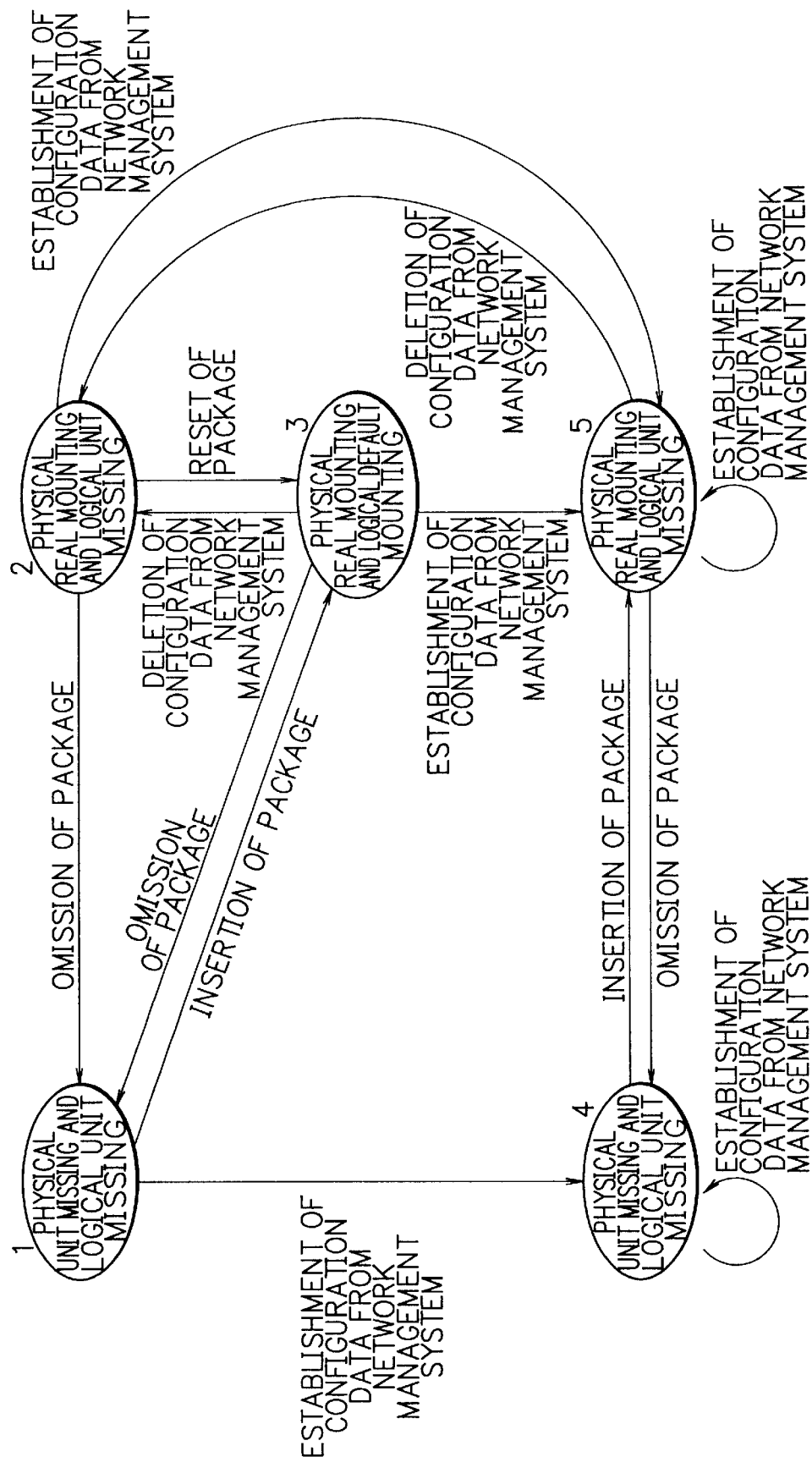
FIG. 2 is a state transition diagram showing storage state according to a package physical mounting/logical mounting storage section of FIG. 1.

FIG. 2 is a state transition diagram showing storage state according to a package physical mounting/logical mounting storage section of FIG. 1.

Here, the physical real mounting is defined as the state that the package 21 is mounted physically on the inside of the slot. The physical unit missing is defined as the state that the package 21 is not mounted physically on the inside of the slot.

Furthermore, the logical unit missing is defined as the state that the establishment data of the package 21 to be inserted into the slot is not stored in the package establishment data storage section 28. The logical default mounting is defined as the state that the establishment data of the package 21 to be inserted into the slot is stored in the package establishment data storage section 28 and the data concerned is the default establishment data. The logical real mounting is defined as the state that the establishment data of the package 21 to be inserted into the slot is stored in the package establishment data storage section 28, and the data concerned is not the default establishment data.

As shown in FIG. 2, when the package 21 is inserted into the slot under the state of ① physical unit missing and logical unit missing, the transit occurs from ① physical unit missing and logical unit missing to ③ physical real mounting and logical default mounting, while when the establishment data is established from the network management system 11, the transit occurs from ① physical unit missing and logical unit missing to ④ physical unit missing and logical real mounting.

When the package 21 is reset under the state of ② physical real mounting and logical unit missing, the transit occurs from ② physical real mounting and logical unit missing to ③ physical real mounting and logical default mounting. When the establishment data is established from the network management system under the state of ② physical real mounting and logical unit missing, the transit occurs from ② physical real mounting and logical unit missing to ⑤ physical real mounting and logical real mounting. When the package 21 is extracted from the slot under the state of ② physical real mounting and logical unit missing, the transit occurs from ② physical real mounting and logical unit missing to ① physical unit missing and logical unit missing.

When the package 21 is extracted from the slot under the state of ③ physical real mounting and logical default mounting, the transit occurs from ③ physical real mounting and logical default mounting to ① physical unit missing and logical unit missing. When the establishment data is removed by the request from the network management system 11 under the state of ③ physical real mounting and logical default mounting, the transit occurs from ③ physical real mounting and logical default mounting to ② physical real mounting and logical unit missing. When the establishment data is established from the network management system 11 under the state of ③ physical real mounting and logical default mounting, the transit occurs from ③ physical real mounting and logical default mounting to ⑤ physical real mounting and logical real mounting.

When the establishment data is established from the network management system 11 under the state of ④ physical unit missing and logical real mounting, the transit occurs from ④ physical unit missing and logical real mounting to ④ physical unit missing and logical real mounting, while when the package 21 is inserted into the slot, the transit occurs from ④ physical unit missing and logical real mounting to ⑤ physical real mounting and logical real mounting.

When the establishment data is established from the network management system under the state of ⑤ physical real mounting and logical real mounting, the transit occurs from ⑤ physical real mounting and logical real mounting to ⑤ physical real mounting and logical real mounting. When the package 21 is extracted from the slot under the state of ⑤ physical real mounting and logical real mounting, the transit occurs from ⑤ physical real mounting and logical real mounting to ④ physical unit missing and logical real mounting. When the establishment data is removed in accordance with the requirement from the network management system 11, the transit occurs from ⑤ physical real mounting and logical real mounting to ② physical real mounting and logical unit missing.

Next, operation of the communication apparatus described-above will be described in detail.

FIGS. 3 to 8 are flowcharts showing flow of operation in the first example of the communication apparatus of FIG. 1. The first example is to show the state where the network management system 11 is actuated as a presupposition of the initial state, while the managed apparatus 12 is not actuated, because the power supply is off and so forth.

Figure 3:
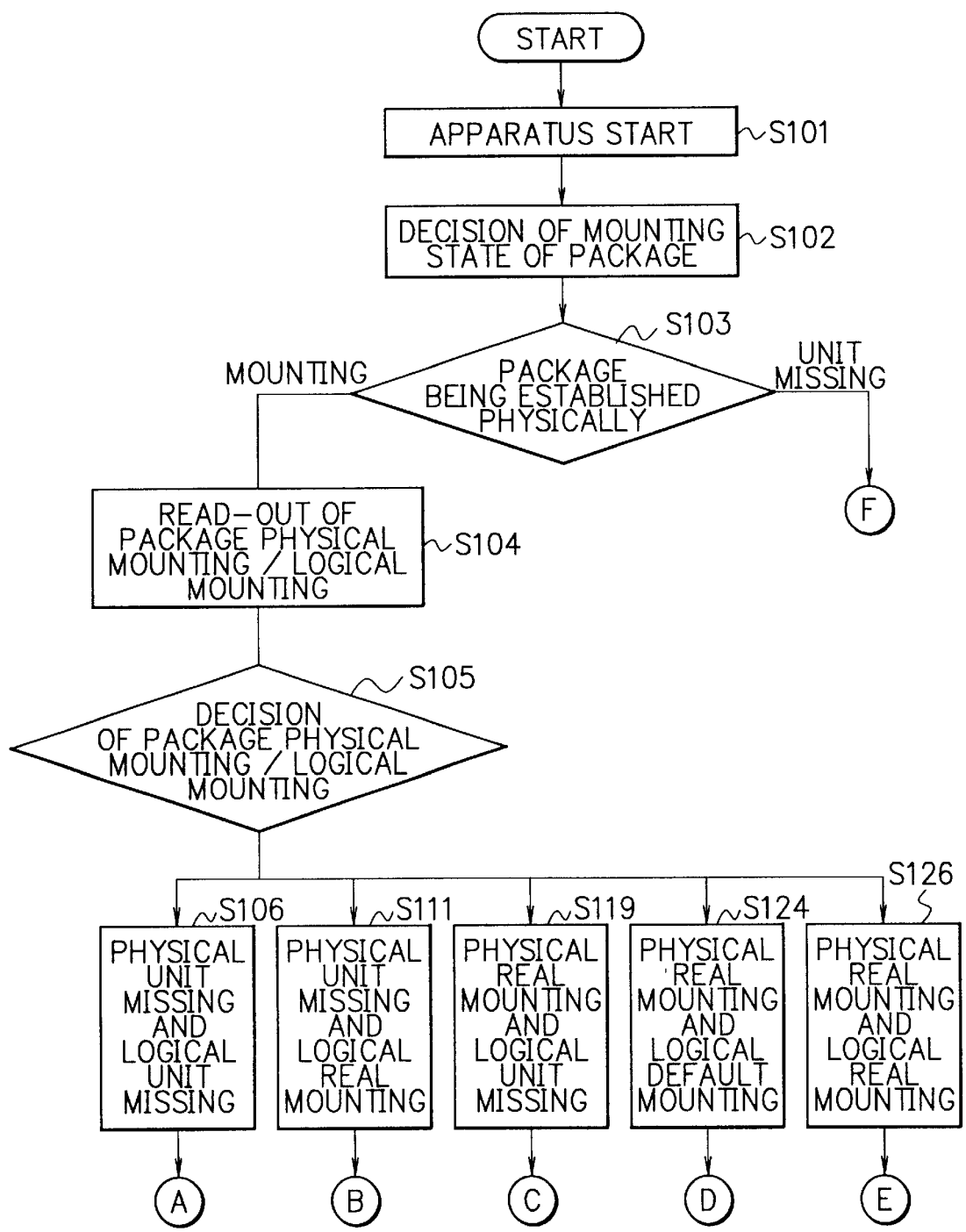
FIG. 3 is a first flowchart showing flow of operation of a first example of the communication apparatus of FIG. 1.

As shown in FIGS. 3 to 8, when the managed apparatus is actuated (FIG. 3, STEP S101), the package physical mounting decision means 27 decides whether the package 21 is inserted physically into the slot, regarding the whole slots (FIG. 3, STEP S102).

When the result of the decision is the physical mounting whether or not the package 21 is inserted physically (FIG. 3, STEP S103), the package physical mounting decision means 27 requires the processing for the package physical mounting/logical mounting processor 24 with the data of the package type and so forth as the parameter.

The package physical mounting/logical mounting processor 24 reads-out the mounting state based on the storage information stored in the package physical mounting/logical mounting state storage section 30 at the time point thereof from the package physical mounting/logical mounting state storage section 30 (FIG. 3, STEP S104). Namely, before actuating the managed device 12, when the package 21 was inserted into the slot, the physical mounting state of the package 21 is stored in the package physical mounting/logical mounting state storage section 30 after actuating the managed apparatus 12.

The package physical mounting/logical mounting processor 24 reads-out the mounting state based on the storage information (FIG. 3, STEP S104), before deciding the state of physical mounting/logical mounting regarding the package 21 concerned (FIG. 3, STEP S105). The mounting state is to be any one of above described ① physical unit missing and logical unit missing, ② physical real mounting and logical unit missing, ③ physical real mounting and logical default mounting, ④ physical unit missing and logical real mounting, and ⑤ physical real mounting and logical real mounting.

When the state of the package 21 concerned is physical unit missing and logical unit missing (FIG. 3, STEP S106), the package physical mounting/logical mounting processor 24 requires the processing for the package establishment data processor 23 with type of the package 21 and so forth as the parameter. The package establishment data processor 23 reads-out the default establishment data of the type of the package 21 concerned from the package establishment default value storage section 29 (FIG. 4, STEP S107) to require the processing to the package establishment means 25.

Figure 4:
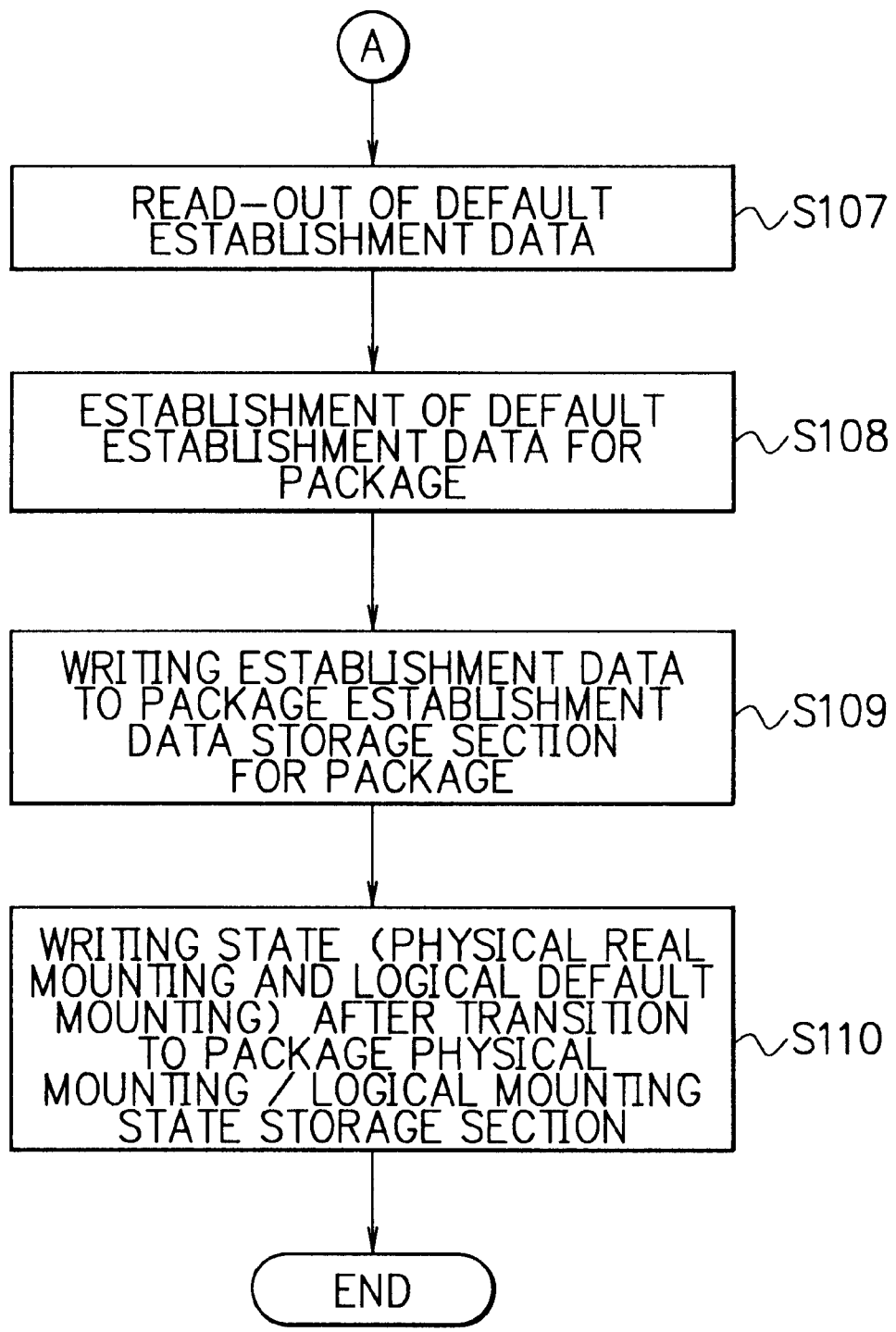
FIG. 4 is a second flowchart showing flow of operation of the first example of the communication apparatus of FIG. 1.

When the package establishment means 25 establishes the establishment of the default to the package 21 (FIG. 4, STEP S108), the package establishment means 25 responds to the package establishment data processor 23, thus writing the establishment data regarding the package 21 concerned into the package establishment data storage section 28 to store therein (FIG. 4, STEP S109). In this example, the default establishment data is stored therein.

The package establishment data processor 23 requires a state transition processing for the package physical mounting/logical mounting processor 24, subsequently, writing to be stored therein the physical real mounting and logical default mounting to the package physical mounting/logical mounting state storage section 30 as the state of after transition of the package 21 (FIG. 4, STEP S110). Subsequently, the processing is terminated.

In STEP S105, when the state of the package 21 concerned is of the physical unit missing and logical real mounting (FIG. 3, STEP P111), the package establishment data processor 23 reads-out the type of the package 21 which is installed on the inside of the slot to acquire from the package establishment data storage section 28 (FIG. 5, STEP S112), before, requiring decision processing to the correction mounting/unit type mismatch means 26 (FIG. 5, STEP S113).

When the decision is of the correct mounting, the package establishment data processor 23 reads-out the package establishment data from the package establishment storage section 28 (FIG. 5, STEP S114), before requiring the processing to the package establishment means 25 with the package establishment data as the parameter. In accordance with the requirement, a configuration data is established to the package 21 (FIG. 5, STEP S115).

At this time, since the package 21 is of the physical real mounting, the package physical mounting/logical mounting processor 24 reads-out to be stored the state of the package 21 concerned as the physical real mounting and logical real mounting in the package physical mounting/logical mounting state storage section 30 (FIG. 5, STEP S116). Subsequently, the processing is terminated.

When the decision is of the unit type mismatch, the package establishment data processor 23 requires the notification of the unit type mismatch for the management data transmission/reception processor 22. The requirement is communicated to the management data processor 18 from the management data transmission/reception processor 22 as the event (FIG. 5, STEP S117).

The management data processor 18 requires the indication to the output device 16 for the user interface processor 17 with the type of the package 21 concerned and the type of the package 21 to be inserted into the slot, thus the indication as being the unit type mismatch is performed for the output device 16 (FIG. 5, STEP S118). Subsequently, the processing is terminated.

In STEP S105, when the state of the package 21 concerned is of the physical real mounting and logical unit missing (FIG. 3, STEP S119), the package physical mounting/logical mounting processor 24 requires the processing for the package establishment data processor 23 with the type of the package 21 concerned as being inserted presently as the parameter.

The package establishment data processor 23 reads-out the default establishment data from the package establishment default value storage section 29 (FIG. 6, STEP S120). The package establishment means 25 establishes the configuration data to the package 21 (FIG. 6, STEP S121).

After the establishment, the package establishment data processor 23 writes to be stored the establishment data of the package 21 concerned to the package establishment data storage section 28 (FIG. 6, STEP S122). In this example, the default establishment data is stored therein.

The package physical mounting/logical mounting processor 24 writes to be stored the physical real mounting and default mounting as the state after transition of the package 21 in the package physical mounting/logical mounting state storage section 30 (FIG. 6, STEP S123). Subsequently, the processing is terminated.

Figure 7A:
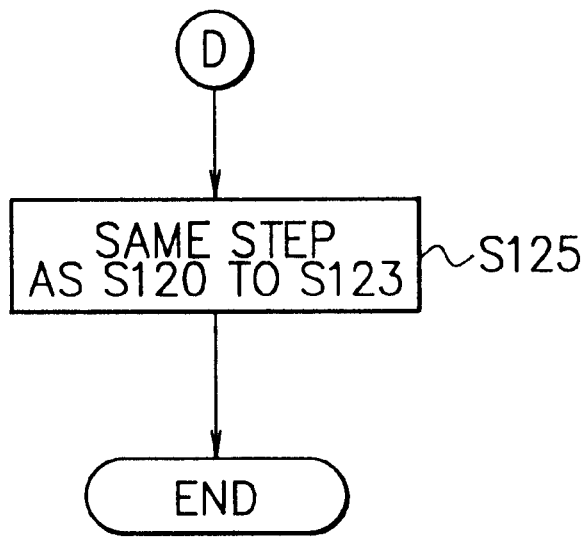
FIGS. 7A, and 7B are fifth flowcharts showing flow of operation of the first example of the communication apparatus of FIG. 1.

In STEP S105, when the state of the package 21 concerned is of the physical real mounting and logical default mounting (FIG. 3, STEP S124), and when the case is the same case as the physical real mounting and logical unit missing the processing is performed with STEP S120 to STEP S123 (referring to FIG. 6) (FIG. 7A, STEP S125). Subsequently, the processing is terminated.

Figure 7B:
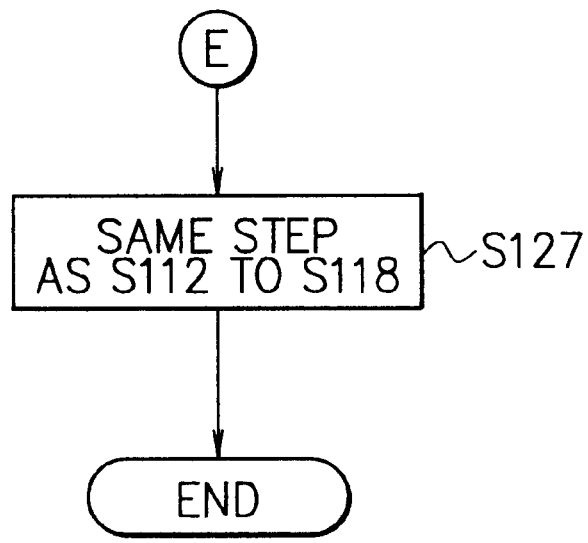

In STEP S105, when the state of the package 21 concerned is of the physical real mounting and logical real mounting (FIG. 3, STEP S126), the case is the same as that of the physical unit missing and the logical mounting, thus the processing is carried out with STEP S112 to STEP S118 (referring to FIG. 5) (FIG. 7B, STEP S127). Subsequently, the processing is terminated.

On the other hand, when result of the decision whether the package 21 is mounted physically is of the physical unit missing (FIG. 3, STEP S103), the processing is required for the package physical mounting/logical mounting processor 24 with an identifier of the slot concerned as the parameter.

Figure 8:
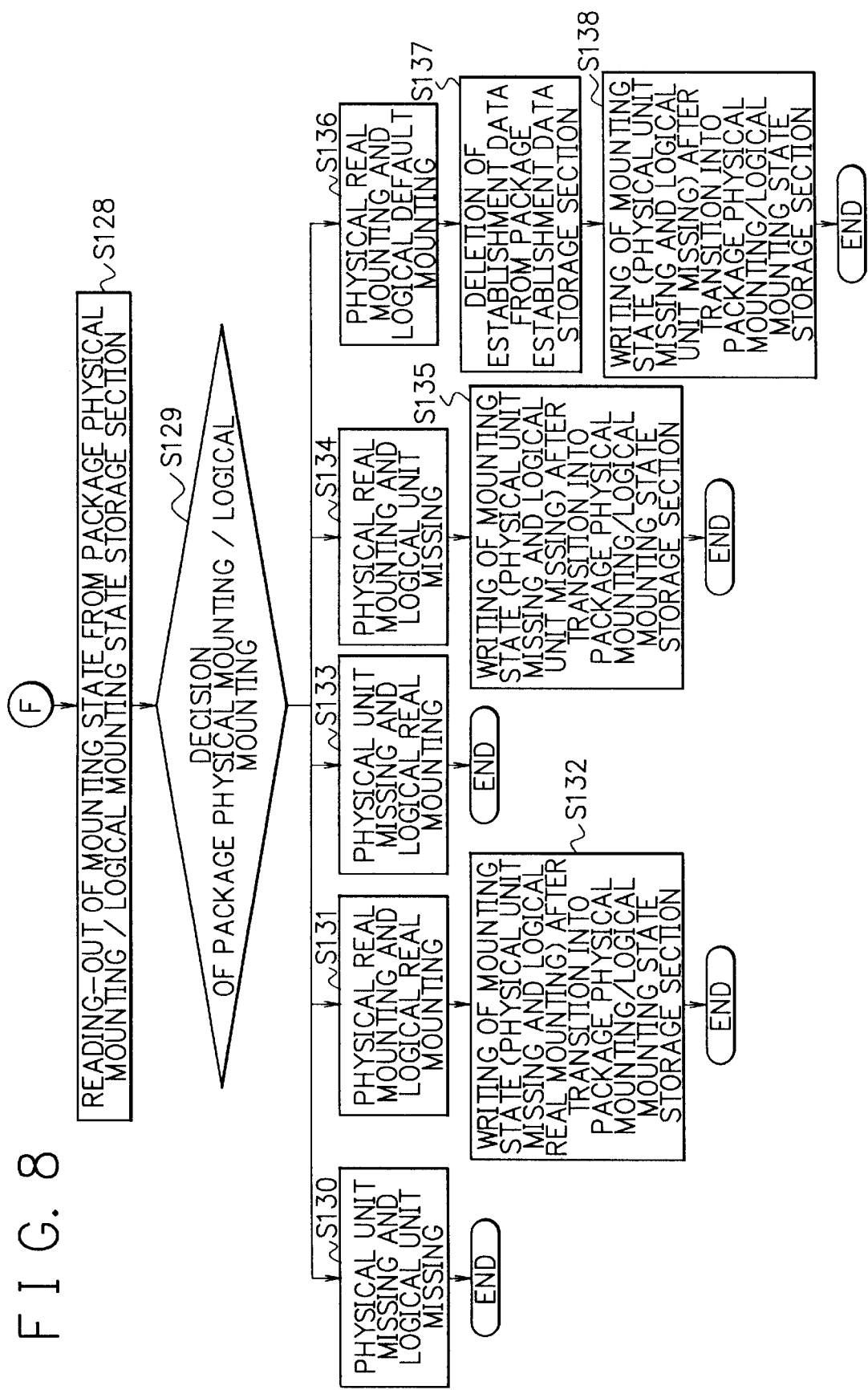
FIG. 8 is a sixth flowchart showing flow of operation of the first example of the communication apparatus of FIG. 1.

The package physical mounting/logical mounting processor 24 reads-out the state of the package 21 concerned according to the storage information stored in the package physical mounting/logical mounting state storage section 30 at this time point from the package physical mounting/logical mounting state storage section 30 (FIG. 8, STEP S128), before the decision is implemented about the state of the physical real mounting and logical real mounting regarding the package 21 concerned (FIG. 8, STEP S129).

In STEP S129, when the state of the slot concerned is of the physical unit missing and logical unit missing (FIG. 8, STEP S130), the processing is terminated.

In STEP S129, when the state of the slot concerned is of the physical real mounting and logical real mounting (FIG. 8, STEP S131), the package physical mounting/logical mounting processor 24 writes to be stored the state of physical unit missing and logical real mounting as the state after transition of the package 21 to the package physical mounting/logical mounting state storage section 30 (FIG. 8, STEP S132). Subsequently, the processing is terminated.

In STEP S129, when the state of the slot concerned is of the physical unit missing and logical real mounting (FIG. 8, STEP S133), the processing is terminated.

In STEP S129, when the state of the slot concerned is of the physical real mounting and logical unit missing (FIG. 8, STEP S134), the package physical mounting/logical mounting processor 24 writes to be stored the state of the physical unit missing and logical unit missing as the state after transition of the package 21 in the package physical mounting/logical mounting state storage section 30 (FIG. 8, STEP S135). Subsequently, the processing is terminated.

In STEP S129, when the state of the slot concerned is of the physical real mounting and logical default mounting (FIG. 8, STEP S136), the package physical mounting/logical mounting processor 24 requires the processing for the package establishment data processor 23. The package establishment data processor 23 deletes the default establishment data with regard to the slot concerned from the package establishment data storage (FIG. 8, STEP S137).

After elimination of the default establishment data to the slot concerned, the physical mounting/logical mounting processor 24 writes to be stored the state of the physical unit missing and logical unit missing as the state after transition of the package 21 in the package physical mounting/logical mounting state storage section 30 (FIG. 8, STEP S138). Subsequently, the processing is terminated.

Next, operation will be described in more detail using concrete example in the first example described above.

Figure 9:
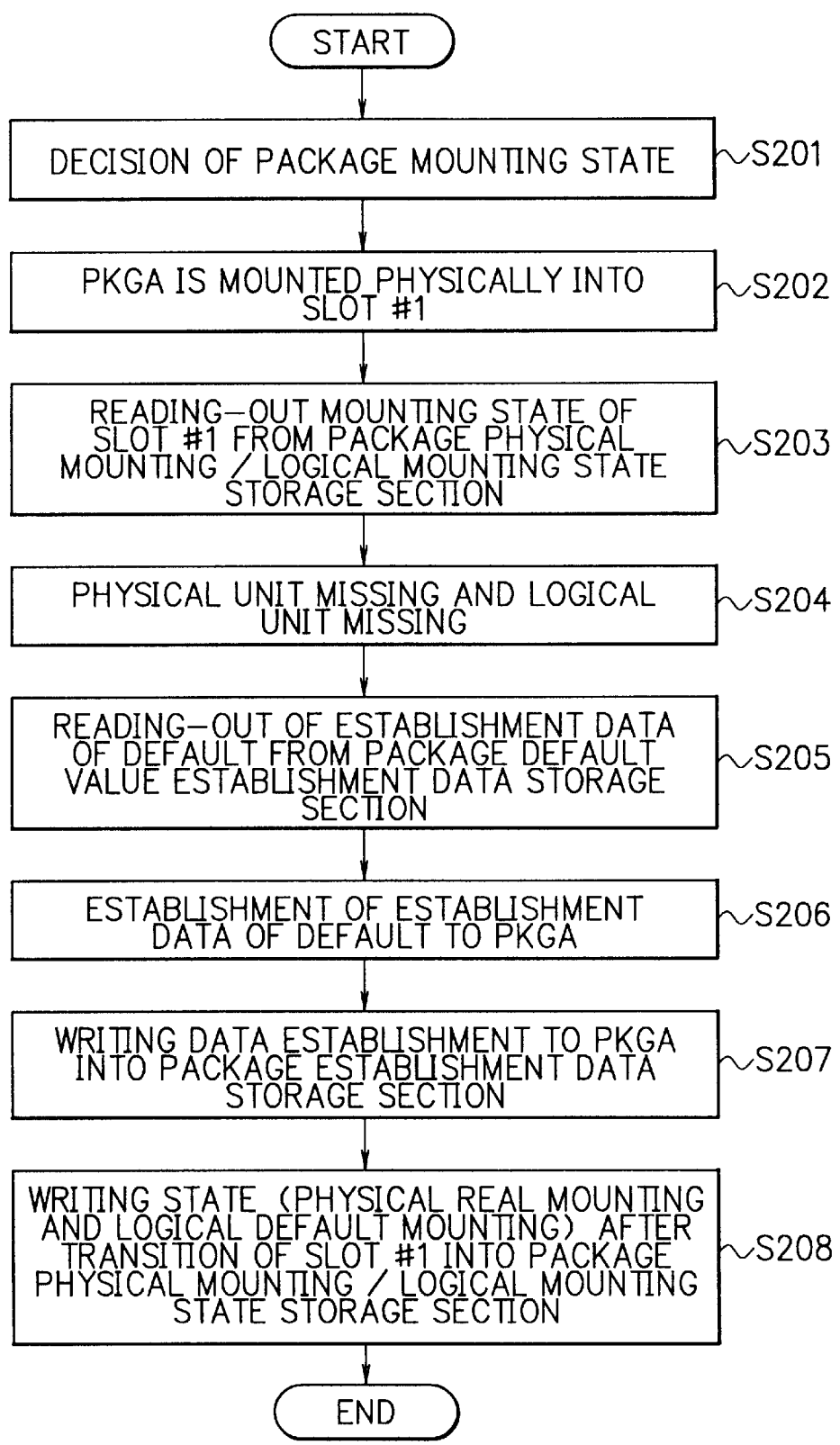
FIG. 9 is a flowchart showing a concrete flow of operation in the first example.

FIG. 9 is a flowchart showing a concrete operation flow in the first example. In FIG. 9, firstly, when the managed apparatus 12 is started, the package physical mounting decision means 27 decides about the whole slots whether the package is inserted physically into the slot (FIG. 9 STEP S201).

In result of the decision, recognition is carried out that the package 21 is physically mounted into the slot #1 (FIG. 9, STEP S202). Here, it makes the type of the package 21 concerned PkgA.

The package physical mounting decision means 27 requires the processing to the package physical mounting/logical mounting processor 24 with the slot #1 and PkgA with the parameter, thus reading-out the mounting state of the slot #1 from the package physical mounting/logical mounting state storage section 30 (FIG. 9, STEP S203).

Here, when the mounting state is of the physical unit missing and logical missing (FIG. 9, STEP S204), the package physical mounting/logical mounting decision means 27 requires the processing of the package establishment data processor 23 with the PkgA as the parameter, reading-out the establishment data of the default for the PkgA from the package establishment default value storage section 29 (FIG. 9, STEP S205).

The establishment read-out is established in the PkgA by the package establishment means 25 (FIG. 9, STEP S206), after establishment, the package establishment data processor 23 writes to be stored the configuration data established in PkgA inserted into the slot #1 in the package establishment data storage section 28 (FIG. 9, STEP S207). In the configuration data written at this time, the data which is established for the type PkgA of the package 21 is included.

After storing the configuration data, the package physical mounting/logical mounting processor 24 writes to be stored that the slot #1 is the physical real mounting and logical default mounting in the package physical mounting/logical mounting state storage section 30 (FIG. 9, STEP S208). Subsequently, the processing is terminated.

At this time, in the default establishment data the establishment data of the communication path is also included, although the path establishment data is not established from the network management system 11. Thus main signal becomes propagated through the PkgA, so that it is capable of providing the communication service.

Figure 10:
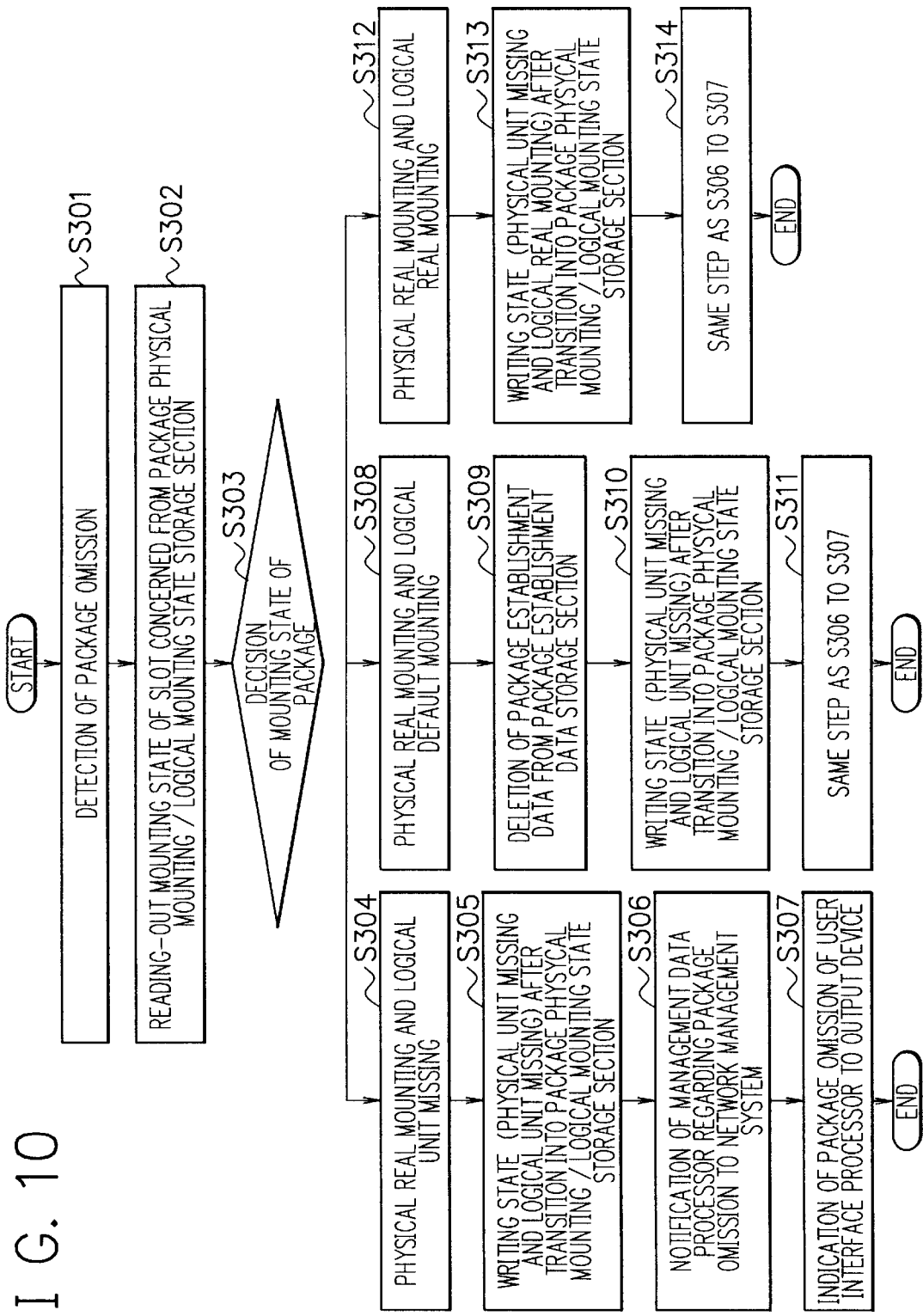
FIG. 10 is a flowchart showing flow of operation in a second example of the communication apparatus of FIG. 1.

FIG. 10 is a flowchart showing flow of operation in the second example of the communication apparatus of FIG. 1. The second example is that the network management system 11 and the managed apparatus are started as the presupposition of the initial state, and the package 21 is inserted into a certain slot of the managed apparatus 12.

As shown in FIG. 10, firstly, when the package 21 is extracted from the slot concerned, the package physical mounting decision means 27 detects omission of the package 21 (FIG. 10, STEP S301), the package physical mounting decision means 27 requires the processing for the package physical mounting/logical mounting processor 24 with the slot concerned as the parameter.

The package physical mounting/logical mounting processor 24 reads-out the mounting state of the slot concerned from the package physical mounting/logical mounting state storage section 30 (FIG. 10, STEP S302), thus deciding the mounting state of the package (FIG. 10, STEP S303).

In STEP S303, when the mounting state read-out is of the physical real mounting and logical unit missing (FIG. 10, STEP S304), the package physical mounting/logical mounting processor 24 writes to be stored the mounting state after transition of the slot concerned as the physical unit missing and logical unit missing in the package physical mounting/logical mounting state storage section 30 (FIG. 10, STEP S305).

In order to communicate this package omission to the operator of the network management system 11, the message is communicated in order of the package establishment data processor 23, and the management data transmission/reception processor 22 with the slot concerned as the parameter.

The management data transmission/reception processor 22 converts the communicated message data into the standard management message, before communicating to the management data processor 18 within the network management system 11 (FIG. 10, STEP S306).

An indication requirement is outputted for the output device 16 from the management data processor 18 which receives the notification to the user interface processor 17, thus the package omission is indicated on the output device 16 (FIG. 10, STEP S307). According to this indication, the package omission of the slot concerned is communicated to the operator. Subsequently, the processing is terminated.

In STEP S303, when the mounting state read-out is of the physical real mounting and logical default mounting (FIG. 10, STEP S308), the package physical mounting/logical mounting processor requires the processing for the package establishment data processor 23 with the slot concerned as the parameter. The package establishment processor 23 deletes the establishment data of the default stored about the slot concerned form the package establishment data storage section 28 (FIG. 10, STEP S309).

After deletion of the default establishment data, the package physical mounting/logical mounting processor 24 writes to be stored the mounting state after transition of the slot concerned as the physical unit missing and logical unit missing in the package physical mounting/logical mounting state storage section 30 (FIG. 10, STEP S310).

With respect to the notification of the package omission to the operator of the network management system 11 after the writing of the mounting state, it is the same as that of the physical real mounting and logical unit missing, thus implementing the processing of STEP S306 to STEP S307 (referring to FIG. 10). Subsequently, the processing is terminated.

In STEP S303, when the mounting state read-out is of the physical real mounting and logical real mounting (FIG. 10, STEP S312), the package physical mounting/logical mounting processor 24 writes to be stored the mounting state after transition of the slot concerned as the physical unit missing and logical real mounting in the package physical mounting/logical mounting state storage section (FIG. 10, STEP S313).

After writing of the mounting state, the notification of the package omission to the operator of the network management system 11 is the same case as that of physical real mounting and logical unit missing, thus implementing the processing of STEP S306 to STEP S307 (referring to FIG. 10) (FIG. 10, STEP S314). Subsequently, the processing is terminated.

Here, it is important that the establishment data of the slot concerned is maintained as it is in the package establishment data storage section 28. When the same type of the package 21 is inserted into the slot concerned again, the correct mounting/unit type mismatch decision means 26 decides as correct mounting, thus the package establishment means 25 establishes the package establishment data maintained in the package establishment data storage section 28 to the package 21.

For that reason, advantage is obtained as follows. For instance, suppose that a lot of communication path establishment is carried out to the package 21 concerned from the network management system 11. Repairs then become necessary caused by package troubles. At the time of repairs, although the package 21 is extracted from the slot, the establishment data including the communication path is stored in the package establishment data storage section 28. Consequently, even though the package 21 is inserted in the slot again after repairs, the same communication path establishment stored in the package establishment data storage section 28 as the communication path establishment before repairs is carried out.

Since the path establishment is unnecessary to execute from the 10 network management system 11, it becomes possible to reduce operator work time in the network management system 11.

Next, operation in the second example described above will be described using concrete example in more detail.

Figure 11:
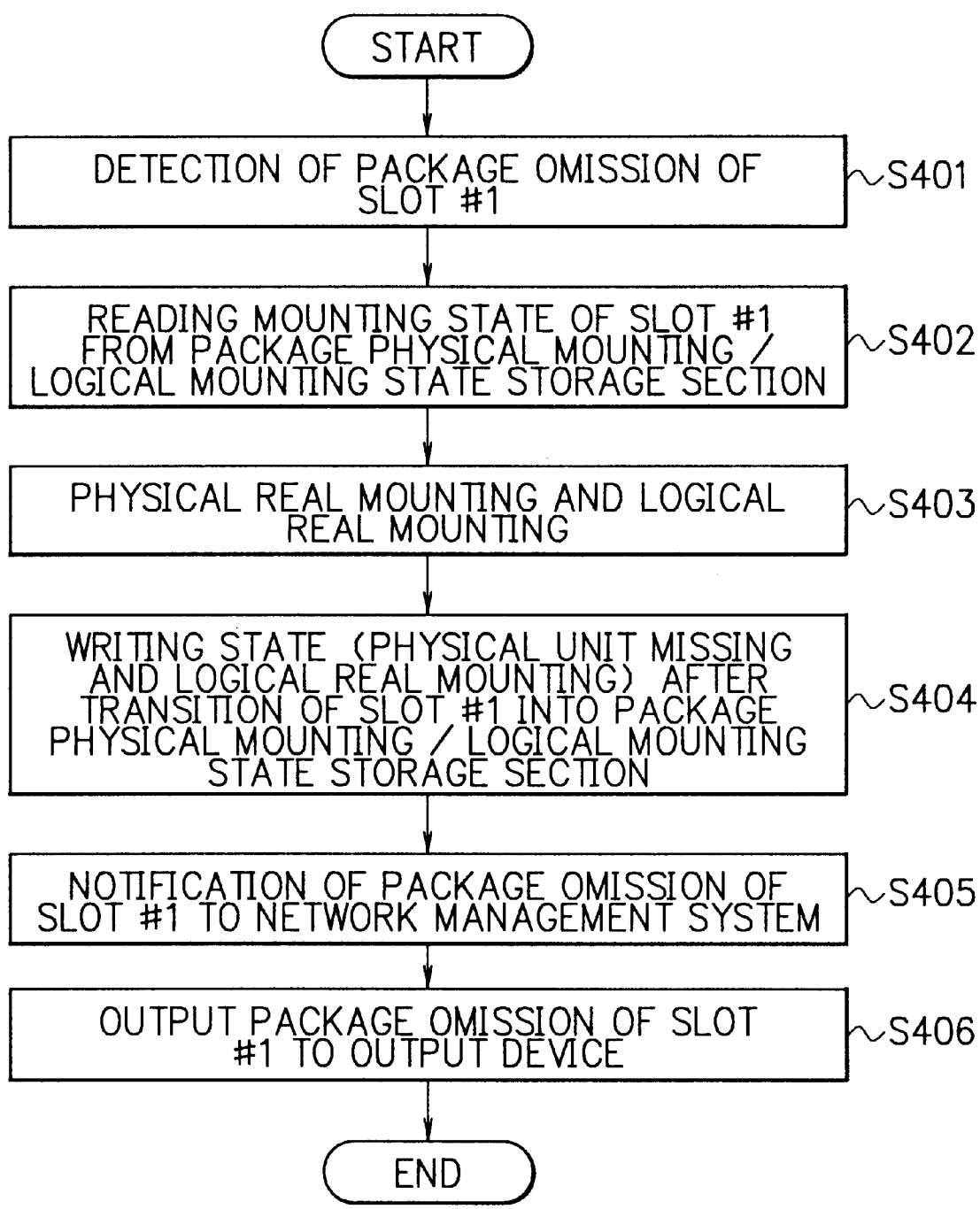
FIG. 11 is a flowchart showing concrete flow of operation in the second example.

FIG. 11 is a flowchart showing concrete flow of operation in the second example. In the example, the network management system 11 and the managed apparatus are started. In the slot #1 of the managed apparatus 12 the package 21 is inserted.

As shown in FIG. 11, firstly, the type of the package 21 is taken as PkgA, when the package 21 is extracted from the slot, the package physical mounting decision means 27 detects the package omission (FIG. 11, STEP S401), Subsequently, requiring the processing for the package physical mounting/logical mounting processor 24.

The package physical mounting/logical mounting processor 24 reads-out the mounting state of the slot #1 from the package physical mounting/logical mounting state storage section 30 (FIG. 11, STEP S402). In the example, the mounting state of the slot #1 is to be the physical real mounting and logical real mounting (FIG. 11, STEP S403).

Subsequently, the package physical mounting/logical mounting processor 24 writes to be stored the mounting state after state transition of the slot #1 as the physical unit missing and logical real mounting in the package physical mounting/logical mounting state storage section 30 (FIG. 11, STEP S404).The package physical mounting/logical mounting processor 24 requires so as to communicate the package omission of the slot #1 to the network management system 11 for the package establishment data processor 23.

According to the requirement, the package omission message of the slot #1 is transmitted in order of the management data transmission/reception processor 22 within the managed apparatus 12, the management data processor 18 within the network management system 11, and the user interface processor 17, so that the package omission of the slot #1 is communicated to the network management system 11 (FIG. 11, STEP S405).

The indication requirement is outputted from the management data processor 18 which receives the notification to the user interface processor 17, thus the package omission is indicated on the output device 16 (FIG. 11, STEP S406). According to this indication, the operator recognizes the package omission of the slot #1. Subsequently, the processing ends.

As mentioned above, the communication apparatus according to the present invention causes the apparatus program to manage the physical mounting which represents whether the package is inserted physically into the slot, and the logical mounting which represents whether the configuration data established to the package inserted into the slot is stored in the package establishment data storage section 28.

Since the apparatus program manages both of the physical real mounting and the logical mounting, in the case where the new package is inserted into the slot whose configuration data is not stored in the package establishment data storage section 28, the apparatus program detects automatically the state of physical real mounting of the package, thus establishing the configuration data of the default value to the package.

Consequently, although the configuration data is not established from the network management system 11, the provision the communication service becomes possible because main signal is of the propagation state.

Further, when the package 21 is inserted into the slot whose configuration data is already established from the network management system 11, the apparatus program detects automatically the physical mounting state of the package, however, establishing the configuration data stored in the package establishment data storage section 28 regardless of implementation of reestablishment of the default value.

In this communication apparatus, supposing that it is the physical unit missing, namely, the package is not inserted into the slot physically, and that it is the logical unit missing, namely, the configuration data established on the package is not stored in the package establishment data.

When new package is inserted into the slot concerned, the package physical mounting decision means 27 detects insertion of the package, thus requiring state acquisition of the physical mounting/logical mounting of the slot concerned to the package physical mounting/logical mounting processor 24 while detecting insertion of the package. The package physical mounting/logical mounting processor 24 reads-out the mounting state from the package physical mounting/logical mounting state storage section 30, according to presupposition, thus obtaining the information that the slot concerned is of the physical unit missing and logical unit missing.

Since the configuration data is not established to the package inserted newly, the package physical mounting/logical mounting processor 24 requires establishment of the default value to the package establishment data processor 23. The package establishment data processor 23 reads-out the default value of the configuration data from the package establishment default value storage section 29, thus requiring establishment for the package to the package establishment means 25.

The package establishment means 25 establishes the configuration data to the package inserted, and the package establishment processor 23 writes the establishment data regarding the slot concerned into the package establishment data storage section 28. The package establishment data written here is the configuration data of the default value.

After establishment of the configuration data, the package physical mounting/logical mounting processor 24 causes the package physical mounting/logical mounting state storage section 30 to store state alteration of the slot concerned. In the case of this presupposition condition, since the configuration data of the default value is established to the package inserted newly, the state value of the physical real mounting and logical default mounting is written.

Since interface establishment data, path establishment data, band establishment data and so forth are included in the configuration data of the default value, thus establishing the communication path, although the configuration data is not established to the apparatus from the network management system 11, the apparatus becomes the state of propagation of the main signal.

The apparatus program implements autonomous establishment to the package inserted newly to change the storage device 20 within the apparatus, thus the apparatus program communicates alteration of the configuration information to the network management system 11. The package establishment data processor 23 reads-out the establishment data regarding the slot concerned into which the configuration data is established from the package establishment data storage section 28, thus requiring the notification of the establishment data to the management data transmission/reception processor 22.

The management data transmission/reception processor 22 which receives the requirement of the notification sends the trap to the network management system 11, and the management data processor 18 receives the trap as the event. For that reason, the management data processor 18 obtains an identifier of the communication apparatus to be the managed apparatus into which new package is inserted, an identifier of the slot, the type of the package, the interface establishment data established in the package, the path establishment data, the bandwidth establishment data and so forth as the management data.

The management data processor 18 writes the management data obtained to store in the management data storage section 15. When the apparatus information concerned is outputted to the output device 16, the management data processor 18 requires so as to indicate the management data obtained on the output device 16 to the user interface processor 17.

The management data which the network management system 11 receives from the device concerned due to the user interface processor 17 is outputted to the output device 16. Therefore, the operator of the network management system 11 recognizes that the configuration data of the default value because of the insertion of the package newly.

Consequently, the communication apparatus according to the present invention brings following effects.

Firstly, although the establishment data of the package mounted in the slot of the managed apparatus is not established from the network management system 11, when the new package is inserted into the slot with the state of physical unit missing and logical unit missing, the establishment data of the package type concerned is established, thus the communication path is established and it becomes possible to provide communication service.

For instance, although the establishment data of the package is not established from the network management system 11 to the managed apparatus 12 in the state that it is forwarded from the factory, the communication path is settled when the package is inserted into the arbitrary slot capable of being inserted physically.

The reason is that the package physical mounting/logical mounting processor 24 manages the state of the physical real mounting and logical real mounting of the slot concerned using the package physical mounting/logical mounting state storage section 30, when the new package is inserted into the slot with the state of physical unit missing and logical unit missing, the package establishment data of the default is read-out from the package establishment default value storage section 29, thus the configuration data is established on the package by the package established means 25.

Secondly, the establishment to the package is maintained permanently without removal on the inside of the managed apparatus 12, even though the package is extracted from the slot, to which package the configuration data is established from the network management system 11.

For instance, the communication path is established to a certain package, which communication path requires the establishment parameter of hundreds of thousands of orders, subsequently, even though the package is extracted, the establishment data is not deleted. Again, when the package of the same type is inserted, the configuration data is reestablished to the package, which configuration data is maintained permanently inside the managed apparatus 12.

The reason is that the package physical mounting/logical mounting processor 24 manages both of the physical real mounting and the logical mounting of the slot concerned, when the package is extracted from the slot with the state of the physical real mounting and logical real mounting, the establishment data is not deleted, which establishment data is stored in the package establishment data storage section 28.

Thirdly, when the package is inserted newly in such the state that the slot established the configuration data for the package from the network management system 11 is of the unit missing physically, the managed apparatus decides autonomously whether mounting is correct mounting or unit type mismatch, thus when the mounting is correct mounting, the configuration data is reestablished, while when the mounting is unit type mismatch, the error is communicated to the operator of the network management system 11.

The reason is that the package physical mounting/logical mounting processor 24 manages both of the physical real mounting and the logical mounting of the slot concerned, when the new package is inserted in the slot with the state of the physical unit missing and logical real mounting, the package establishment data processor 23 reads-out the type of the package stored in the package establishment data storage section 28, and the correct mounting/unit type mismatch decision means 26 compares the type of the new package with the type of the package stored in the package establishment data storage section 28, thus deciding the correct mounting and the unit type mismatch.

FIGS. 12 to 16 are flowcharts showing flow of operation in the third example of the communication apparatus of FIG. 1.

In the first and the second examples described above (referring to FIGS. 3 to 8, and FIG. 10), although the establishment data for the package of the managed apparatus 12 is not established from the network management system 11, since the data processor 19 on the inside of the apparatus reads the establishment data to the package from the package establishment default value storage section 29 or from the package establishment data storage section 28 to establish to the package, it is capable of providing the communication service while flowing main signal to the apparatus.

On the other hand, in the third example, there is difference that the network management system 11 establishes the establishment data for the package regarding the managed apparatus 12. Here, it is important that it becomes possible of establishment of the managed apparatus 12 before providing the communication service, because the type of the package to be inserted into the slot concerned and the establishment data such as the configuration data and so forth are capable of being established from the network management system 11 before mounting the package into the slot.

Figure 12:
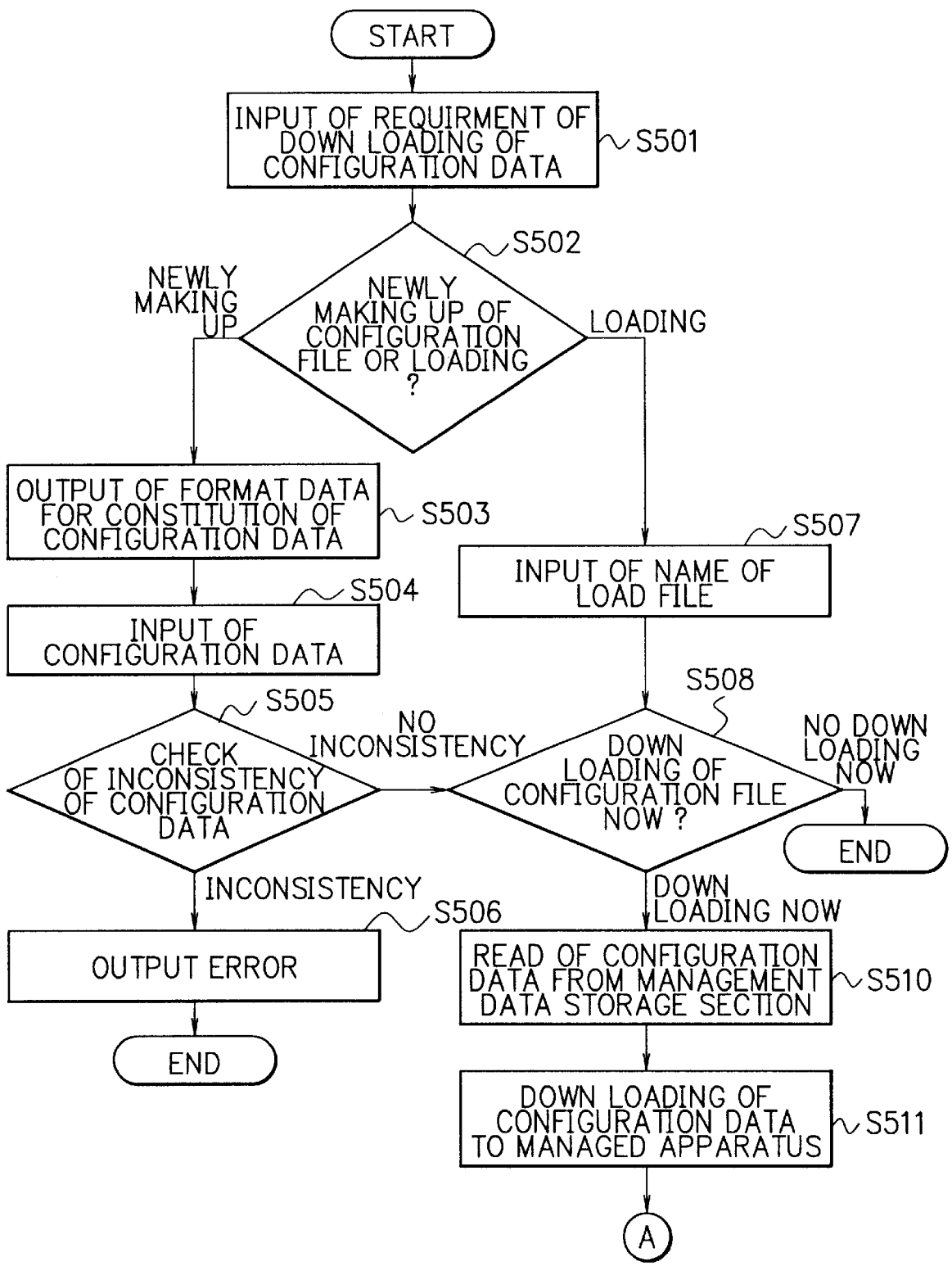
FIG. 12 is a first flowchart showing flow of operation in a third example of the communication apparatus of FIG. 1.

As shown in FIGS. 12 to 16, in the first place, the operator of the network management system 11 inputs down loading requirement for implementing the down loading of the configuration data of the package 21 to the user interface processor 17 from the input device 13 (FIG. 12 STEP S501).

The user interface processor 17 causes the output device 16 to output a selection screen for the sake of selection whether it causes the file with the configuration data to be loaded to the output device 16 or making up the configuration data file newly.

The operator selects which one of load of configuration file already existing or making up the configuration file newly from the selection screen while operating the input device 13 (FIG. 12, STEP S502).

In the case of making up the configuration file newly, the user interface processor 17 causes the output device 16 to output a format screen for constituting configuration data (FIG. 12, STEP S503).

The configuration data is inputted to the user interface processor 17 from the format screen indicated while operating the input device 13 by the operator (FIG. 12, STEP S504). In the configuration data, the identifier of the managed apparatus of the establishment candidate, the identifier of the slot, the type of the package 21 to be inserted into the slot concerned, and the parameter of the communication path established to the package 21 concerned and so forth are included.

The operator inputs the message of input end from the input device 13 to the user interface processor 17 after inputting the whole establishment data.

After inputting the input end message, the user interface processor 17 investigates whether there is inconsistency in the configuration file (FIG. 12 STEP S505). When there is inconsistency, the user interface processor 17 outputs error to the output device 16 (FIG. 12, STEP S506), thus terminating the processing, while when there is no inconsistency, proceeding to STEP S508 describing later, thus selecting whether the configuration file is subjected to down loading now.

On the other hand, when the configuration file already existing is subjected to the loading in STEP S502, the user interface processor 17 causes the output device 16 to output the screen for inputting file name to be subjected to the loading.

When the operator selects to be inputted the load file name from the screen (FIG. 12, STEP S507), the user interface processor 17 causes the output device 16 to output the selection message whether the configuration data is subjected to the down loading now (FIG. 12, STEP S508).

From the input device 13, when the input operation is carried out that the down loading is not executed now, the processing is terminated, while when the input operation is carried out that the down loading is executed now, the user interface processor 17 reads the configuration file concerned from the management data storage section 15 (FIG. 12, STEP S510), thus requiring execution of the down loading to the management data processor 18.

The management data processor 18 which receives the requirement executes the down loading of the configuration file to the management data transmission/reception processor 22 on the inside of the managed apparatus 12 (FIG. 12, STEP S511).

In the managed apparatus 12, when the management data transmission/reception processor 22 receives processing requirement (FIG. 13, STEP S512), transferring the processing requirement including the configuration file to the package establishment data processor 23. The package establishment data processor 23 to which the processing requirement is transferred requires acquisition of the mounting state of the package 21 concerned to the package physical mounting/logical mounting processor 24 with the identifier of the slot concerned as the parameter.

Figure 13:
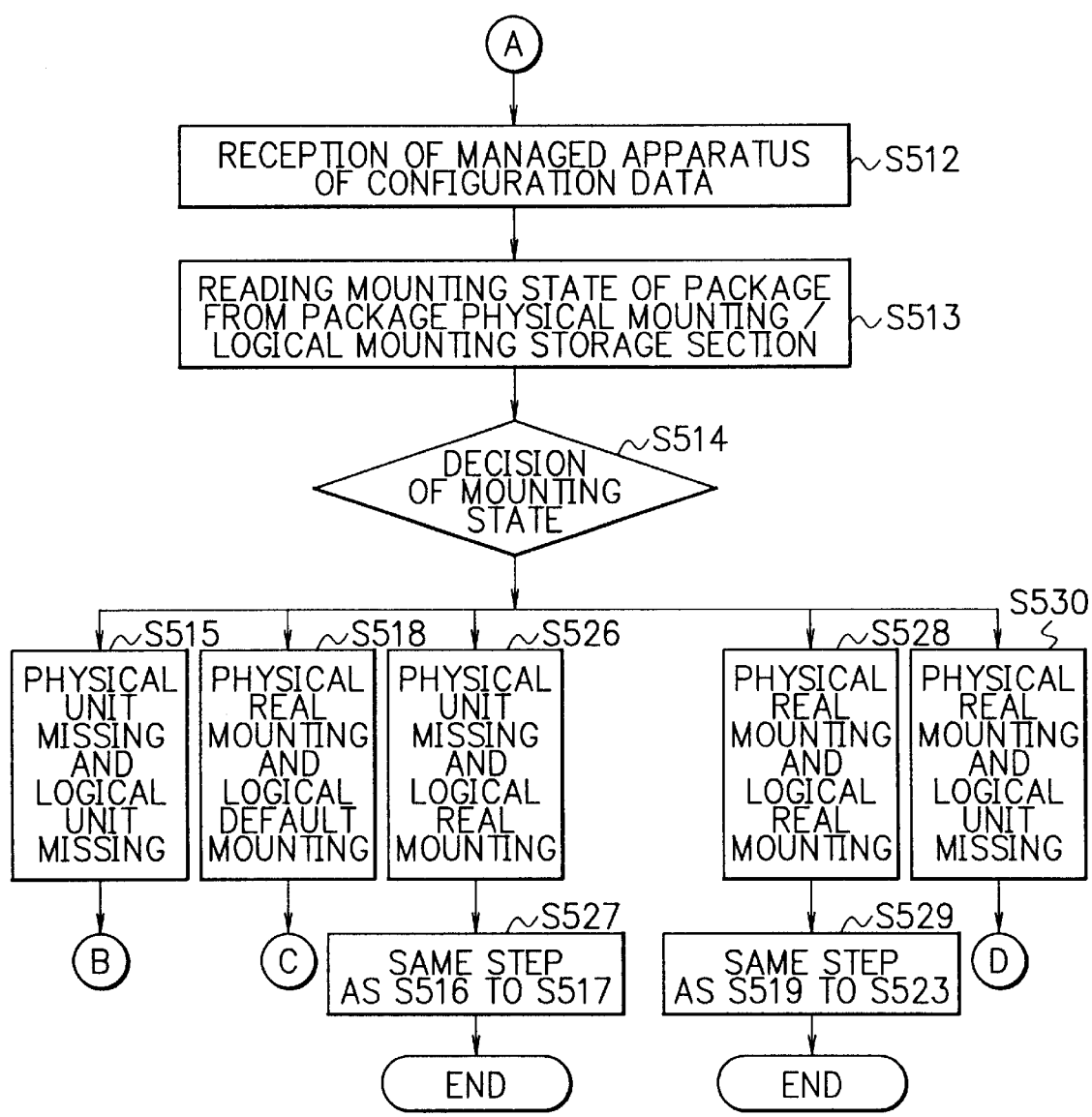
FIG. 13 is a second flowchart showing flow of operation in the third example of the communication apparatus of FIG. 1.

The package physical mounting/logical mounting processor 24 reads the mounting state of the package 21 from the package physical mounting/logical mounting state storage section 30 (FIG. 13, STEP S513), thus deciding about the mounting state read previously (FIG. 13, STEP S514). According to the decision result, the processing executed later becomes different.

Figure 14:
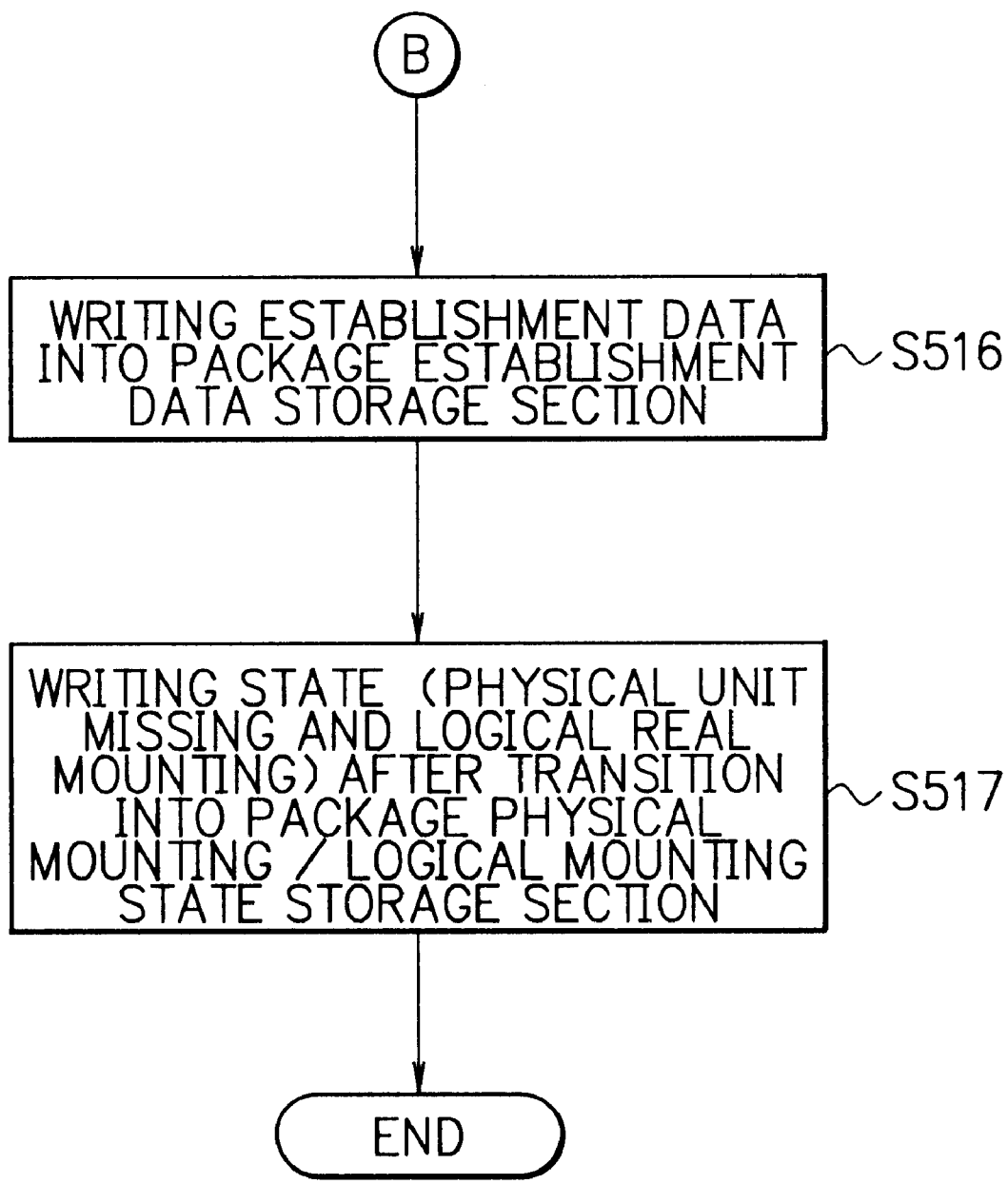
FIG. 14 is a third flowchart showing flow of operation in the third example of the communication apparatus of FIG. 1.

In STEP S514, when the slot concerned is of the physical unit missing and logical unit missing (FIG. 13, STEP S515), the package establishment data processor 23 writes the establishment data undergoing down loading from the network management system 11 in the package establishment storage section 28 (FIG. 14, STEP S516). Furthermore, the package physical mounting/logical mounting processor 24 writes the state of physical unit missing and logical real mounting which is the state of after transition of the slot concerned into the package physical mounting/logical mounting state storage section 30. (FIG. 14, STEP S517). Subsequently, the processing is terminated.

Figure 15:
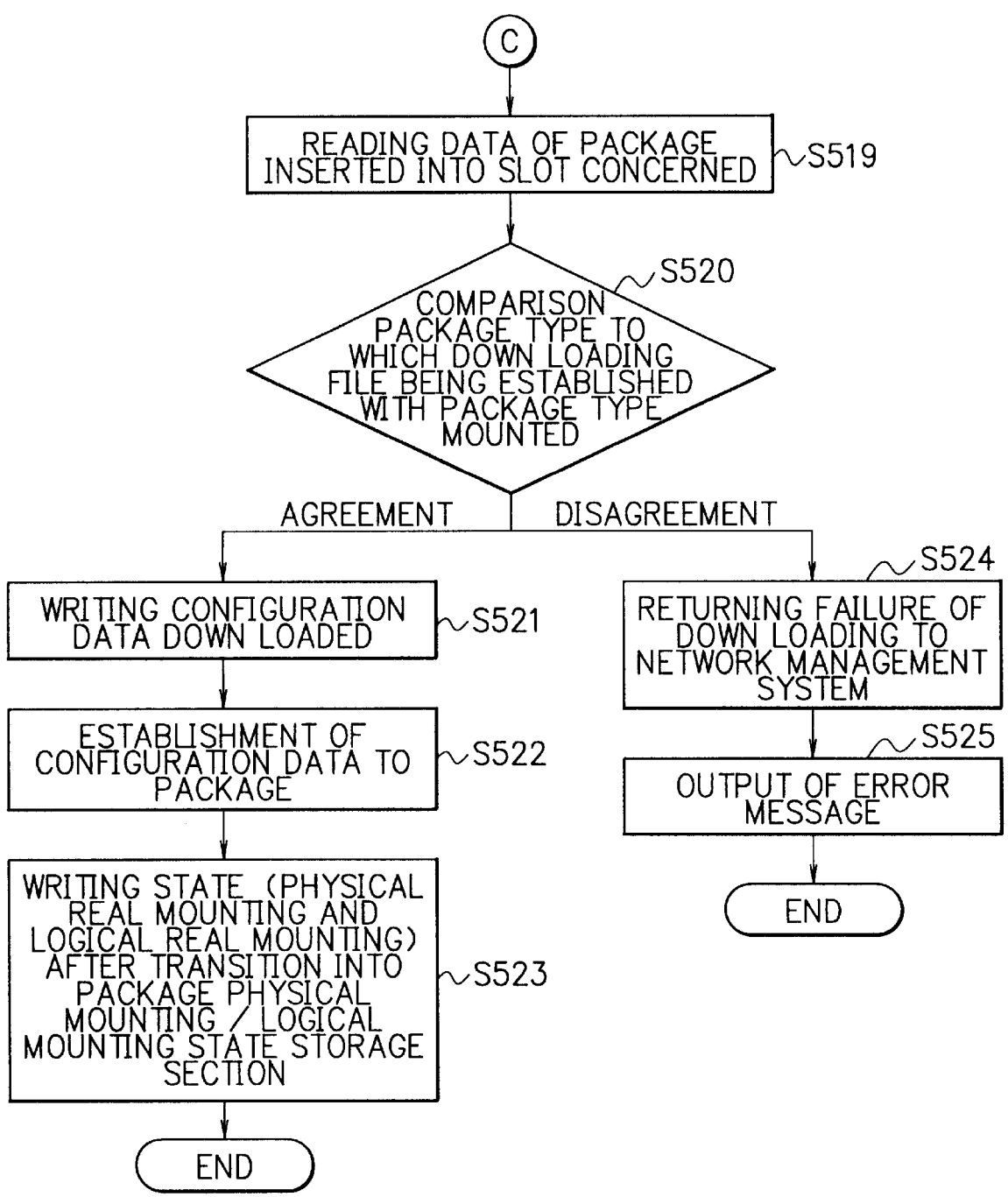
FIG. 15 is a fourth flowchart showing flow of operation in the third example of the communication apparatus of FIG. 1.

In STEP S514, when the slot concerned is of the physical real mounting and logical default mounting (FIG. 13, STEP S518), the package establishment data processor 23 reads the data of the package 21 inserted into the slot concerned from the package establishment data storage section 28 (FIG. 15, STEP S519). Subsequently, the package establishment data processor 23 compares the type of the package capable of being established the file undergoing down loading from the network management system 11 with the type of the package 21 as being mounted, thus deciding whether the former agrees with the later (FIG. 15, STEP S520).

When the package type agrees with each other, the package establishment data processor 23 writes the establishment data undergoing down loading toward the package establishment data storage section 28 (FIG. 15, STEP S521), thus requiring the establishment of the configuration data for the package 21 to the package establishment means 25.

The package establishment means 25 which receives the data establishing requirement establishes the configuration data to the package 21 which is mounted into the slot (FIG. 15, STEP S522), after establishment, the package physical mounting/logical mounting processor 24 writes the state of the physical real mounting and the logical mounting as the state of after transition into the package physical mounting/logical mounting state storage section 30 (FIG. 15, STEP S523). Subsequently, the processing is terminated.

On the other hand, when the package type disagrees with each other, the package establishment data processor 23 restores error information of failure of down loading to the management data processor 18 (FIG. 15, STEP S524). The error information is transferred in order of the management data processor 18 within the network management system 11, and the user interface processor 17, thus the error message is indicated on the output device 16 (FIG. 15, STEP S525). Subsequently, the processing is terminated.

In STEP S514, when the slot concerned is of the physical unit missing and logical real mounting (FIG. 13, STEP S526), the processing is the same as that of the case of physical unit missing and logical unit missing with the exception of the following point. The processing is carried out about STEP S516 to STEP S517 (referring to FIG. 14) (FIG. 13, STEP S527). Subsequently, the processing is terminated.

In the case of the physical unit missing and logical unit missing, the establishment data undergoing down loading from the network management system 11 is stored in the package establishment data storage section 28 by the package establishment data processor 23, while in the case of the physical unit missing and logical real mounting, the establishment in regard to the slot concerned is deleted from the package establishment data storage section 28, before the establishment data undergoing down loading is stored therein by the package establishment data processor 23.

In STEP S514, when the slot concerned is of the physical real mounting and logical real mounting (FIG. 13, STEP S528), the processing content is the same as that of the physical real mounting and logical default mounting, thus carrying out the processing of STEP S519 to STEP S525 (referring to FIG. 15) (FIG. 13, STEP S529). Subsequently, the processing is terminated. The state of the package 21 after transition is of the physical real mounting and logical real mounting.

In STEP S514, when the slot concerned is of the physical real mounting and logical unit missing (FIG. 13, STEP S530), the package establishment data processor 23 requires acquisition of the type of the package 21 inserted into the slot concerned to the package establishment means 25.

The package establishment means 25 reads the type of the package 21 (FIG. 16, STEP S531), subsequently, the package establishment data processor 23 compares the type of the package 21 mounted on the inside of the slot concerned with the type of the package to which the configuration file undergoing down loading from the network management system is capable of being established, thus deciding whether the former type agrees with the later type (FIG. 16, STEP S532).

When the package agrees with each other, implementing the processing STEP S521 to STEP S523 (referring to FIG. 15) (FIG. 16, STEP S533), subsequently, the processing is terminated. When the package disagrees with each other, implementing the processing STEP S524 to STEP S525 (referring to FIG. 15) (FIG. 16, STEP S534), subsequently, the processing is terminated.

Next, operation will be described using concrete example in the third example described-above.

FIG. 17 is a flowchart showing concrete flow of operation in the third example. In this example, as a presupposition, supposing that the managed apparatus 12, the slot #1, the configuration data of the package type being PkgA undergo down loading, and the mounting state of the slot #1 before executing down loading is of the physical unit missing and logical unit missing.

In FIG. 17, the operator inputs the down loading requirement of the configuration data while specifying the file pkg-A-config.dat (FIG. 17, STEP S601). When the operator inputs the load file name, the user interface processor 17 reads the file pkg-A-config.dat from the management data storage section 15 (FIG. 17, STEP S602).

The operator inputs the managed apparatus 12, and the slot #1 as the parameter denoting candidate of the down loading. The file pkg-A-config.dat undergoes down loading from the management processor 18 to the management data transmission/reception processor 22 on the inside of the managed apparatus 12 (FIG. 17, STEP S603), thus the processing requirement is transferred to the package establishment data processor 23.

The package establishment data processor 23 requires acquisition of the mounting state of the slot #1 to the package physical mounting/logical mounting processor 24, and the package physical mounting/logical mounting processor 24 reads the mounting state of the slot #1 from the package physical mounting/logical mounting state storage section (FIG. 17, STEP S604).

In this example, according to the presupposition, the state is of the physical unit missing and logical unit missing (FIG. 17, STEP S605), therefore, the package establishment data processor 23 receives the present mounting state as a response, before writing the package establishment data pkg-A-config.dat (FIG. 17, STEP S606).

After writing of the package establishment data, the package physical mounting/logical mounting processor 24 writes the physical unit missing and logical real mounting as the state of after transition into the package physical mounting/logical mounting state storage section 30 (FIG. 17, STEP S607). Subsequently, the processing is terminated.

In the third example, the establishment parameter for settling the communication path, including the type of the package 21 to be inserted in the slot concerned and the band width data and so forth, undergo down-loading as the configuration file from the network management system 11 to the managed apparatus 12 in which the package 21 is not mounted in the slot.

For that reason, the package establishment of the managed apparatus 12 becomes possible before inserting the package 21, thus the communication service is provided while the communication path is settled immediately after inserting the package physically, so that plug-and-play can be realized in the managed apparatus (communication apparatus) 12.

As mentioned above, according to the present invention, the apparatus program manages both of the physical mounting representing whether the package is inserted physically into the slot and the logical mounting representing whether the configuration data to be established to the package inserted into the slot is stored in the package establishment data storage section.

Consequently, although the establishment data of the package 5 mounted in the package of the managed apparatus 12 is not established from the network management system 11, when the new package is inserted into the slot with the state of the physical unit missing and logical unit missing, the establishment data of the package type concerned is established to the package. Thus the communication path is settled and it becomes possible to provide communication service.

Further, even though the package to which the configuration data is established from the network management system 11 is extracted from the slot, the establishment data to the package maintained permanently on the inside of the managed apparatus without deletion.

Furthermore, when the slot in which the configuration data is established to the package from the network management system 11 is of the state of unit missing physically and the package is inserted newly, the managed apparatus 12 decides autonomously whether the mounting is the correct one or the unit type mismatch, when the mounting is correct one, reestablishing the configuration data, while when the mounting is the unit type mismatch, communicating the error to the operator of the network management system 11.

Moreover, both of the program for the sake of data processing within the managed apparatus and the program for the sake of data processing within the network management system are stored in the storage medium storing therein the program for the sake of data processing respectively, thus the program for the sake of data processing controls operation of the hardware (computer), therefore, the hardware undergoing the program control is capable of implementing both of the data processing on the inside of the apparatus instructed by the control program and the data processing on the inside of the network management system.

As mentioned above, according to the present invention, the data processor establishes the configuration data to the package mounted in the slot to which a package chosen is capable of being established, therefore, even though the establishment data of the package mounted in the slot of the communication apparatus is not established from the external system, when the new package is inserted into the slot with the state of the physical unit missing and logical unit missing, the establishment data of the package type concerned is established to the package, thus the communication service is capable of being provided while the communication path is settled.

Namely, the apparatus program manages both the physical mounting representing whether the package is inserted physically into the slot and the logical mounting representing whether the configuration which is established to the package inserted into the slot is stored in the package establishment data storage section. Even though the establishment data of the package mounted in the slot of the managed apparatus is not established from the network management system, when the new package is inserted into the slot with the state of the physical unit missing and logical unit missing, the establishment data of the package type concerned is established to the package. Thus it become possible to provide the communication service while the communication path is settled.

Moreover, even though the package to which the configuration data is established from the network management system is extracted from the slot, the establishment data to the package is maintained permanently within the managed apparatus with the exception of the deletion.

Moreover, when the package is inserted into the slot with the condition that the slot in which the configuration data is established to the package from the network management system is of the unit missing physically, the managed apparatus decides autonomously whether the mounting is of the correct mounting or the unit type mismatch, in the case of the correct mounting, the configuration data is reestablished, while in the case of the unit type mismatch, the error is communicated to the operator of the network management system.

What is claimed is:

1. A communication apparatus comprising:
    a plurality of slots at which a package is inserted;
    a communication path settled such that configuration data is established to the package inserted at one of said plurality of slots; and
    a data processor configured to establish said configuration data to the package, wherein said data processor manages both a physical mounting state comprising a condition in which the package is physically inserted at said slot and a logical mounting state comprising a condition in which the configuration data to be established to said package inserted at said slot is stored in a data storage section, the configuration data being different from default configuration data, the configuration data being based on said physical mounting state and said logical mounting state, wherein said data processor, when said package to which said configuration data is established from an external system is removed, stores the configuration data in an internal storage, such that in case the package of a same type is installed again, the path to the package is reestablished using the configuration data stored in the internal storage.

2. A communication apparatus as claimed in claim 1, wherein said data processor implements downloading of said configuration data including an establishment parameter of a communication path, before said package is inserted at said slot, thus said configuration data is established after insertion of said package.

3. A communication apparatus as claimed in claim 1, wherein said data processor establishes a path to the package using the default configuration data, when a package with un-established configuration data is inserted at said slot with a state of physical unit missing and a state of logical unit missing.

4. A communication apparatus as claimed in claim 1, wherein said data processor reestablishes, when a package of a different type is inserted at the slot the package to which said configuration data of said default is established has been removed, said default configuration data of a package type inserted.

5. One of an Asynchronous Transfer Mode switch and a Digital Subscriber Line Access Multiplexer communication apparatus comprising:
   a plurality of slots at which a package is inserted;
   a communication path, settled such that a configuration data is established to the package inserted at one of said plurality of slots; and
   a data processor configured to establish said configuration data to the package, said configuration data being based on a physical mounting state of the package and logical mounting state of the package,
   wherein said data processor, when removing said package to which said configuration data is established from an external system, stores said configuration data established in an internal storage means, in case said package of a same type is inserted again, said configuration data stored therein is reestablished.

6. A communication apparatus comprising:
   a plurality of slots at which a package is inserted;
   a communication path, settled such that a configuration data is established to the package inserted at one of said plurality of slots; and
   a data processor configured to establish said configuration data to the package,
   wherein said data processor comprises:
      a management data transmission/reception processor for implementing processing while transmitting/receiving a management data to an external system;
      a package establishment data processor for implementing a package establishment processing according to an input of either a package establishment default value data stored beforehand, or a package establishment data from said management data transmission/reception processor;
      a package physical mounting/logical mounting processor reading-out a mounting state of mounted package requiring processing corresponding to said mounting state to said package establishment data processor;
      a package establishment means receiving said establishment data from said package establishment data processor, subsequently executing a establishment processing for said package mounted, thus communicating execution result to said package establishment data processor;
      a correct mounting/unit type mismatch decision means for deciding whether said mounted package is of the correct mounting or the unit type mismatch, before communicating the decision result to said package establishment data processor; and
      a package physical mounting decision means detecting state of physical mounting of said package, requiring processing to said package physical mounting/logical mounting processor according to variation of the mounting state.

7. A package physical mounting/logical mounting state management method comprising:
   determining package establishment data according to both a mounting state data of the package inserted at a slot connected to a communication apparatus and data that is transmitted from hardware of said package as a parameter, after receiving an insertion notification of said package signaling insertion of said package at said slot; and
   implementing package establishment data processing, when a before transition state is of physical real mounting logical default mounting, while deciding a next state according to mounting state of said package at a time of reception of omission notification of said package,
   said data processing performed such that when the package to which configuration data is established from an external system is removed, in case the package of a same type is installed again, the path to the package is reestablished using the configuration data stored in an internal storage, the configuration data being different from default configuration data.

8. A processing method of package establishment data comprising:
   establishing, before a writing as an after transition state a physical real mounting and logical default mounting state, a default establishment data to a package inserted at a slot, in case said package state is physical unit missing and logical unit missing;
   implementing decision processing of correct mounting/unit type mismatch, such that in case of correct mounting, configuration data to said package to be written is according to physical real mounting and logical real mounting as the state after transition, and such that in the case of unit type mismatch, unit type mismatch is indicated, if said package state is of the physical unit missing and logical real mounting;
   establishing the configuration data to the package to write the physical real mounting and logical default mounting as the state of after transition, in case the package is of a state physical real mounting and logical unit missing;
   implementing the same processing as that of the case of the physical real mounting and logical unit missing, in case the package is of a state physical real mounting and logical default mounting;

implementing the same processing as that of the case of the physical unit missing and logical real mounting, in case the package is of the state physical real mounting and logical real mounting.

9. A storage medium storing a data processing program within an apparatus, the program comprising instructions to perform:

after starting a managed apparatus, deciding for each slot of a plurality of slots, whether a package is physically inserted into a slot of said plurality of slots;

requiring package physical mounting/logical mounting state processing based on the type of package inserted at a slot as a parameter, upon deciding that a state is physical real mounting;

reading-out a mounting state according to storage information; and deciding the state of physical real mounting and logical real mounting for the package, after reading-out the mounting state according to the storage information establishing configuration data to the package inserted based on the physical mounting state and the logical mounting state.

10. A storage medium storing a data processing program within an apparatus comprising:

a step, after starting a managed apparatus, for deciding for each slot of a plurality of slots, whether a package is physically inserted into a slot of said plurality of slots;

a step for requiring package physical mounting/logical mounting state processing based on the type of package inserted at a slot as a parameter, upon deciding that a state is physical real mounting;

a step for reading-out a mounting state according to storage information; and a step for deciding the state of physical real mounting and logical real mounting for the package, after reading-out the mounting state according to the storage information, further comprising:

a step, after receiving insertion notification of the package, for determining a package establishment data according to both a mounting state of the package and data received from hardware of the package inserted as a parameter; and a step, when receiving an omission notification of the package, for package establishment data processing to decide the state of a next transition according to the mounting state of the package concerned.

11. A storage medium storing a data processing program within an apparatus comprising:

a step, after starting a managed apparatus, for deciding for each slot of a plurality of slots, whether a package is physically inserted into a slot of said plurality of slots;

a step for requiring package physical mounting/logical mounting state processing based on the type of package inserted at a slot as a parameter, upon deciding that a state is physical real mounting;

a step for reading-out a mounting state according to storage information; and a step for deciding the state of physical real mounting and logical real mounting for the package, after reading-out the mounting state according to the storage information;

wherein a step for determining a state of physical real mounting and logical real mounting for the package comprises:

a step for writing physical real mounting and logical default mounting as the state after transition while establishing a default establishment data to the package, in case the initial state is physical unit missing and logical unit missing;

a step, when the initial state is physical unit missing and logical real mounting, for implementing decision processing of correct mounting/unit type mismatch, such that in the case of correct mounting, configuration data to the package is established with the state physical real mounting and logical real mounting as the state after transition, and such that in case of unit type mismatch, a unit type mismatch is indicated;

a step for writing physical real mounting and logical default mounting as the state after transition while establishing the configuration data to the package, when the package is of the physical real mounting and logical unit missing state;

a step for implementing the same processing as the case of the physical real mounting and logical unit missing, when the package is of the physical real mounting and logical default mounting state; and a step for implementing the same processing as the case of the physical unit missing and logical real mounting state, when the package is of the physical real mounting and the logical mounting state.

12. A storage medium for storing a data processing program within an apparatus as claimed in claim 10, wherein a step for deciding a state of physical real mounting and logical real mounting for the package comprises:

a step for writing physical real mounting and logical default mounting as the state after transition while establishing a default establishment data to the package in case the package is of the physical unit missing and logical unit missing state;

a step, when the package concerned is of the physical unit missing and logical real mounting state, for implementing decision processing of correct mounting/unit type mismatch, such that in the case of correct mounting, configuration data to the package according to the after transition state physical real mounting and logical real mounting, and such that in case of unit type mismatch, indicating unit type mismatch;

a step for writing the physical real mounting and logical default mounting as the state after transition, while establishing the configuration data to the package, when the package is of the physical real mounting and logical unit missing state;

a step for implementing the same processing as the case of the physical real mounting and logical unit missing state, when the package is of the physical real mounting and logical default mounting state; and a step for implementing the same processing as the case of the physical unit missing and logical real mounting state, when the package is of the physical real mounting and the logical mounting state.

* * * * *